(12) United States Patent
Denning et al.

(10) Patent No.: US 8,472,627 B2
(45) Date of Patent: *Jun. 25, 2013

(54) SYSTEM AND METHOD FOR DELIVERING ENCRYPTED INFORMATION IN A COMMUNICATION NETWORK USING LOCATION INDENTITY AND KEY TABLES

(75) Inventors: Dorothy E. Denning, Arlington, VA (US); Barry J. Glick, Washington, DC (US); Ronald S. Karpf, Gaithersburg, MD (US); Mark E. Seiler, Los Angeles, CA (US)

(73) Assignee: Geocodex LLC, Encino, CA (US)

( * ) Notice: Subject to any disclaimer, the term of this patent is extended or adjusted under 35 U.S.C. 154(b) by 1647 days.

This patent is subject to a terminal disclaimer.

(21) Appl. No.: 11/561,857

(22) Filed: Nov. 20, 2006

(65) Prior Publication Data

US 2007/0086593 A1  Apr. 19, 2007

Related U.S. Application Data

(63) Continuation of application No. 09/992,378, filed on Nov. 16, 2001, now Pat. No. 7,143,289, which is a continuation-in-part of application No. 09/699,832, filed on Oct. 30, 2000, now Pat. No. 6,985,588.

(51) Int. Cl.
*G06F 12/14* (2006.01)

(52) U.S. Cl.
USPC ................................ 380/258; 726/26; 726/27

(58) Field of Classification Search
None
See application file for complete search history.

(56) References Cited

U.S. PATENT DOCUMENTS

| | | | |
|---|---|---|---|
| 4,418,425 A | 11/1983 | Fennel, Jr. et al. | |
| 4,468,793 A | 8/1984 | Johnson et al. | |
| 4,531,020 A | 7/1985 | Wechselberger et al. | |
| 4,709,266 A | 11/1987 | Hanas et al. | |
| 4,860,352 A * | 8/1989 | Laurance et al. | 380/258 |
| 4,887,296 A | 12/1989 | Horne | |

(Continued)

FOREIGN PATENT DOCUMENTS

| | | |
|---|---|---|
| EP | 0649121 | 4/1995 |
| EP | 0997808 | 5/2000 |

(Continued)

OTHER PUBLICATIONS

Stein (Lincoln D. Stein, "Web Sercurity, a step-by -step reference guide", 1998, ISBN: 0201634899), p. 38-42.*

(Continued)

*Primary Examiner* — Peter Poltorak
(74) *Attorney, Agent, or Firm* — O'Melveny & Myers LLP

(57) ABSTRACT

Access to digital data is controlled by encrypting the data in such a manner that it can be decrypted only at a specified location, within a specific time frame, and with a secret key. Data encrypted in such a manner is said to be geo-encrypted. This geo-encryption process comprises a method in which plaintext data is first encrypted using a data encrypting key that is generated at the time of encryption. The data encrypting key is then encrypted (or locked) using a key encrypting key and information derived from the location of the intended receiver. The encrypted data encrypting key is then transmitted to the receiver along with the ciphertext data. The receiver both must be at the correct location and must have a copy of the corresponding key decrypting key in order to derive the location information and decrypt the data encrypting key.

43 Claims, 10 Drawing Sheets

U.S. PATENT DOCUMENTS

| | | | |
|---|---|---|---|
| 4,993,067 A | 2/1991 | Leopold | |
| 5,241,594 A | 8/1993 | Kung | |
| 5,243,652 A | 9/1993 | Teare et al. | |
| 5,532,838 A | 7/1996 | Barbari | |
| 5,577,122 A | 11/1996 | Schipper et al. | |
| 5,586,185 A | 12/1996 | Shibata et al. | |
| 5,640,452 A | 6/1997 | Murphy | |
| 5,659,617 A | 8/1997 | Fischer | |
| 5,727,057 A | 3/1998 | Emery et al. | |
| 5,740,252 A | 4/1998 | Minor et al. | |
| 5,754,657 A | 5/1998 | Schipper et al. | |
| 5,757,916 A | 5/1998 | MacDoran et al. | |
| 5,790,074 A | 8/1998 | Rangedahl et al. | |
| 5,799,083 A | 8/1998 | Brothers et al. | |
| 5,884,312 A | 3/1999 | Dustan et al. | |
| 5,898,680 A | 4/1999 | Johnstone et al. | |
| 5,915,019 A | 6/1999 | Ginter et al. | |
| 5,919,239 A | 7/1999 | Fraker et al. | |
| 5,920,861 A | 7/1999 | Hall et al. | |
| 5,922,073 A | 7/1999 | Shimada | |
| 5,943,422 A | 8/1999 | Van Wie et al. | |
| 5,956,716 A | 9/1999 | Kenner et al. | |
| 5,978,747 A | 11/1999 | Craport et al. | |
| 5,982,897 A | 11/1999 | Clark | |
| 5,987,136 A | 11/1999 | Schipper et al. | |
| 5,991,739 A | 11/1999 | Cupps et al. | |
| 5,991,876 A | 11/1999 | Johnson et al. | |
| 6,003,030 A | 12/1999 | Kenner et al. | |
| 6,006,332 A | 12/1999 | Rabne et al. | |
| 6,041,411 A | 3/2000 | Wyatt | |
| 6,046,689 A | 4/2000 | Newman | |
| 6,055,314 A * | 4/2000 | Spies et al. | 380/228 |
| 6,057,779 A | 5/2000 | Bates | |
| 6,061,688 A | 5/2000 | Kilpatrick et al. | |
| 6,070,174 A | 5/2000 | Starek et al. | |
| 6,091,816 A | 7/2000 | Woo | |
| 6,104,815 A | 8/2000 | Alcorn et al. | |
| 6,237,033 B1 | 5/2001 | Doeberl et al. | |
| 6,240,360 B1 | 5/2001 | Phelan | |
| 6,240,514 B1 | 5/2001 | Inoue et al. | |
| 6,317,500 B1 | 11/2001 | Murphy | |
| 6,370,629 B1 * | 4/2002 | Hastings et al. | 711/163 |
| 6,384,709 B2 | 5/2002 | Mellen et al. | |
| 6,434,699 B1 | 8/2002 | Jones et al. | |
| 6,460,071 B1 | 10/2002 | Hoffman | |
| 6,550,011 B1 | 4/2003 | Sims, III | |
| 6,668,322 B1 | 12/2003 | Wood et al. | |
| 6,731,612 B1 | 5/2004 | Koss | |
| 6,775,655 B1 * | 8/2004 | Peinado et al. | 705/59 |
| 6,948,062 B1 | 9/2005 | Clapper | |
| 2001/0026619 A1 * | 10/2001 | Howard et al. | 380/279 |
| 2002/0077988 A1 * | 6/2002 | Sasaki et al. | 705/59 |

FOREIGN PATENT DOCUMENTS

| | | |
|---|---|---|
| JP | 09-506227 | 6/1997 |
| JP | 09-319662 | 12/1997 |
| JP | 10-40100 | 2/1998 |
| JP | 10-341212 | 12/1998 |
| JP | 11-331144 | 11/1999 |
| JP | 2000-11538 | 1/2000 |
| JP | 2000-163379 | 6/2000 |
| JP | 2001-53741 | 2/2001 |
| JP | 2002-123172 | 4/2002 |
| KR | 2000-0035903 | 6/2000 |
| WO | WO 95/15634 | 6/1995 |
| WO | WO 9951038 | 10/1999 |
| WO | WO 0027143 | 5/2000 |
| WO | WO/00/41090 | 7/2000 |
| WO | WO/01/22201 | 3/2001 |

OTHER PUBLICATIONS

Menezes (Alfred J. Menezes, Paul C. van Oorschot, Scott A. Vanstone, "Handbook of Applied Cryptography" 1997, ISBN: 0849385237); in view of Murphy (U.S. Patent No. 6,317,500).

Schneier (Bruce Schneier, "Applied Cryptography, Protocols, Algorithms and Source Code in C" $2^{nd}$ Edition, 1996 ISBN:0471128457.

* cited by examiner

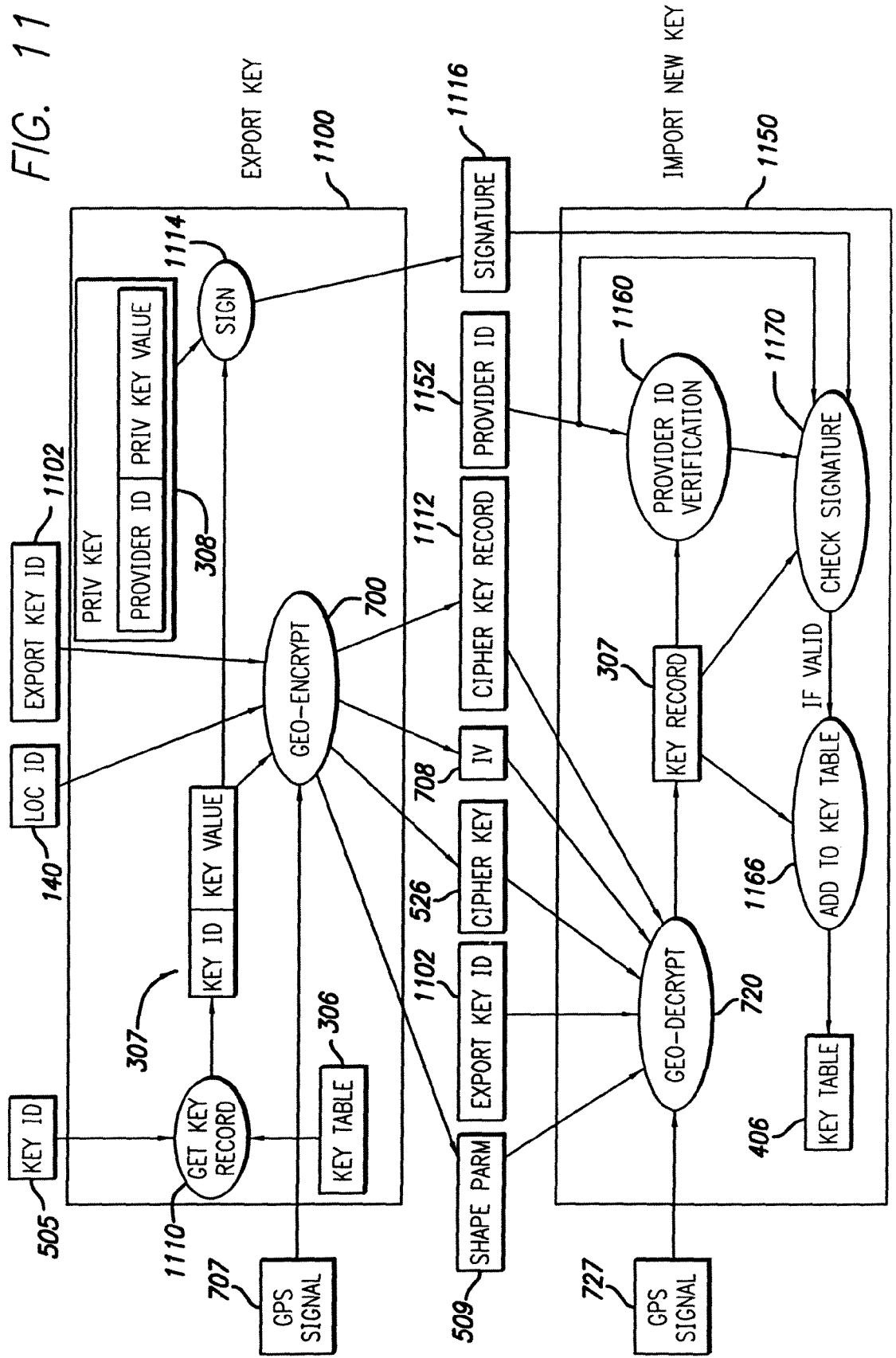

SYSTEM AND METHOD FOR DELIVERING ENCRYPTED INFORMATION IN A COMMUNICATION NETWORK USING LOCATION INDENTITY AND KEY TABLES

RELATED APPLICATION DATA

This patent application is a continuation of U.S. patent application Ser. No. 09/992,378, filed Nov. 16, 2001, now issued as U.S. Pat. No. 7,143,289 on Nov. 28, 2006, which is a continuation-in-part of U.S. patent application Ser. No. 09/699,832 filed Oct. 30, 2000, now issued as U.S. Pat. No. 6,985,588 on Jan. 10, 2006, and U.S. patent application Ser. No. 09/758,637 filed Jan. 10, 2001, now issued as U.S. Pat. No. 7,120,254 on Oct. 10, 2006.

BACKGROUND OF THE INVENTION

1. Field of the Invention

The present invention relates to controlling access to digital data through a communication network based on location. More particularly, the present invention relates to a method and apparatus for encrypting digital data in a communication network in such a manner that it can be decrypted only at a specified location and using a secret key.

2. Description of Related Art

Rapid advances in computer, telecommunications and networking technology have enabled new opportunities and applications that were impossible just a few years ago. These advances are exemplified by the rapid growth of network systems seeking to delivery "high-value" content securely to authorized recipients. Examples of such networks include those that handle confidential, sensitive, or classified information in the health care, financial, and national security fields. They also include networks that handle intellectual property or copyrighted data such as computer software, literary works, and entertainment products. Controlling the security of information in such systems, including confidentiality, authenticity, integrity, authorized use, transaction secrecy, site protection, etc., has proven to be a difficult problem that has reduced the benefit that businesses and consumers might otherwise enjoy from such systems.

One technology that is critical to protecting information on these networks is cryptography. Cryptography is the use of codes and ciphers to protect data from unintended disclosure or modification. It is primarily used to control access to communications transmitted over open networks, but may also be used to control access to stored data. In a transmission utilizing cryptography to protect digital data, the sender converts the original data, or "plaintext," into a coded equivalent called "ciphertext" using an encryption algorithm. The ciphertext is then decoded (or decrypted) by the receiver and thereby turned back into plaintext. The encryption algorithm uses a key, which in digital systems is a string of bits. In general, the larger the number of bits in the key, the longer it takes to break the code using so-called "brute force" methods.

Keys form the basis of all cryptographic systems. Two separate cryptographic key methods have been widely adopted by users of electronic networks: private-key cryptography and public-key cryptography. With private-key cryptography (also known as symmetric cryptography), the sender and receiver use a common secret key to encrypt and decrypt data. With public-key cryptography (also known as asymmetric cryptography), the sender and receiver use different but mathematically related keys to encrypt and decrypt the data. In particular, the sender encrypts the data using a public key that is unique to the receiver, while the receiver decrypts the data using the corresponding private key that is known only to the receiver. Because separate keys are used, public-key cryptography also can be used to provide digital signatures for authentication and non-repudiation. In this case, the sender signs the data using the sender's private key, while the receiver validates the data using the sender's public key.

Owing to their different mathematics, private-key cryptography is generally much more efficient than public-key cryptography. It runs faster and can provide comparable security using shorter keys. Consequently, most network systems use private-key cryptography to encrypt and decrypt most types of data. Public-key cryptography, if used at all, is presently used only to distribute the secret keys used with private-key cryptography and to digitally sign data.

The shared secret keys used with private-key cryptography can be distributed using either private-key or public-key methods. Private-key distribution methods are particularly well suited to broadcast and multicast applications where a central, shared server transmits data to one or more receivers simultaneously, such as subscription television, and to other applications that involve communications to or from a central server. Public-key distribution methods are particularly well suited to applications involving communications between two entities that do not trust each other and do not employ a shared server, such as electronic mail delivered across the Internet and connections between web browsers and web servers.

With both public-key and private-key cryptography, anyone knowing the secret key needed to decrypt the data can decrypt and access that data, assuming the method of encryption is known (which is generally assumed). It does not matter where the person is located or how the person acquired the data. For some applications, however, it would be desirable to control access to data based not only on a secret key, but also on location. For example, in the context of digital cinema, such a capability would enable a producer of digital movies to be assured that its products could only be decrypted in certain theaters whose locations would be known in advance. Or, a provider of entertainment products such as movies and subscription television would be assured that its products could only be decrypted within the premises of its customers or within a particular geographic region. This capability would guard against many threats, including the unauthorized distribution of copyright-protected works over the Internet or through other means. Even if the keys were compromised, recipients would not be at the proper location to enable decryption. The related patent applications referenced above disclose a method and system for encrypting digital data based on location.

It would also be desirable to have a capability to control access to data based on the distribution path of the data. For example, such a capability would enable a provider of protected works to be assured that its works were distributed through specific channels. Persons acquiring the product through other channels would then be unable to decrypt the data, even if they acquired the secret key. This capability could be used even when location is not a factor for authorizing decryption. Location-based encryption and path-dependent encryption would significantly enhance the security of data.

Another limitation of conventional encryption systems, particularly those that are based entirely on private-key cryptography, is that key management is vested with a single entity. Key management refers to the control over distribution of keys within a network. By restricting key management to a single entity, data providers that do not have key management authority are limited in their ability to control access to their digital data through the networks. Therefore, in addition to using location-based encryption and path-dependent encryption, it would be desirable to provide a method and system whereby multiple data providers can independently manage the secret keys they use to communicate with other providers and receivers.

SUMMARY OF THE INVENTION

In accordance with the present invention, access to digital data is controlled by encrypting the data in such a manner that, in a single digital data acquisition step, it can be decrypted only at a specified location and with a secret key. If the sender so elects, access to digital data also can be controlled by encrypting it in such manner that it must traverse a specific route from the sender to the recipient in order to enable decryption of the data.

Data encrypted in such a manner is said to be geo-encrypted. This geo-encryption process comprises a method in which plaintext data is first encrypted using a random data encryption key that is generated at the time of encryption. The data encrypting key is then encrypted (or locked) using a location value and a key encrypting key. The encrypted data encrypting key is then transmitted to the receiver along with the ciphertext data. The receiver both must be at the correct location and must have a copy of a corresponding key decrypting key in order to derive the location key and decrypt the data encrypting key. After the data encrypting key is decrypted (or unlocked), it is used to decrypt the ciphertext. If an attempt is made to decrypt the data encrypting key at an incorrect location or using an incorrect key decryption key, the decryption will fail. In addition, the encrypted data encrypting key or ciphertext optionally may be rendered unusable so that it becomes impossible to ever decrypt that particular ciphertext. The data encrypting key may also be encrypted in a manner that it can only be accessed at a certain time or during a specific time frame.

In accordance with an embodiment of the invention, the ciphertext data can be routed through one or more intermediary distributors before being transmitted to a final receiver. One method for doing this involves encrypting the data encrypting key with a location value and key encrypting key for the distributor. The distributor then decrypts the data encrypting key and re-encrypts it using a location value and key encrypting key for the receiver. The distributor does not have to decrypt the ciphertext, although nothing would prevent it from doing so. Another method for routing the ciphertext through a distributor involves encrypting the data encrypting key first with a location value and key encrypting key for the final receiver and then with a location value and key encrypting key for the distributor. The distributor removes its layer of encryption from the key before forwarding it to the receiver. If there are multiple distributors, the data encrypting key is successively encrypted with a location value and key encrypting key for each distributor on the path, but in reverse order. As the encrypted key is passed from one distributor to the next, each distributor removes its layer of encryption. With this method, none of the distributors can decrypt the data encrypting key because it remains encrypted with the location value and key encrypting key for the final receiver. Thus, the distributors cannot access the plaintext. This method also forces the ciphertext to follow a particular path to the receiver.

Another embodiment of the invention provides a method for distributing shared secret keys, specifically shared key encrypting/decrypting keys. These secret keys are transmitted from one place to another using the same techniques as for distributing any form of digital data. Specifically, a secret key that is to be distributed to a receiver is encrypted using a data encrypting key. The data encrypting key, in turn, is encrypted using a location value and an existing key encrypting key associated with the receiver. The transmission is also digitally signed to ensure that only the owners of keys can create, change, and delete their keys. The sender can manage the secret keys required for decryption in a secure manner that is transparent to the recipient. As a consequence of its ability to manipulate the secret keys, the sender of encrypted data retains the ability to control access to its plaintext even after its initial transmission.

The aforementioned methods of the present invention employ a combination of private-key (i.e., symmetric) and public-key (i.e., asymmetric) cryptography. Plaintext data is encrypted and decrypted with private-key cryptography. The random data encryption key, however, can be encrypted and decrypted using either private-key cryptography or public-key cryptography. If private-key cryptography is used, the key encrypting key and key decrypting key are identical. The key encrypting/decrypting key is also kept secret. In contrast, if public-key cryptography is used, the key encrypting key is a separate public key, while the key decrypting key is a mathematically-related but distinct private key. Only the private, key decrypting key needs to be kept secret. Public-key cryptography is also used for authentication of the communications used to distribute the secret key encrypting/decrypting keys used with private-key cryptography. Public-key cryptography may also be used to authenticate other communications. It should be understood that private-key cryptography, public-key cryptography, or both could be used to distribute key decrypting keys in accordance with alternative embodiments of the invention.

In one embodiment of the invention, a communication network includes a producer device, a distributor device, a receiver device, and an administrator device. Each of these devices includes a key table that stores a plurality of key encrypting and key decrypting keys, and public and private signature keys. Some of these keys may be used with private-key cryptography, while others are used with public-key cryptography. The producer device encrypts the source digital data, such as a television episode or motion picture. The distributor device enables the secure transmission of the digital data initiated by the producer to either other distributors or to a designated receiver. The receiver device provides for receipt and end-user access to the plaintext of the digital data.

The administrator device has administrative control over some or all of the keys in the key tables. Providers, including producers, distributors and administrators, can add new keys to their own devices and to the devices of others, although they may be limited in the total number of keys that can be added to any particular device. Providers also can change and delete any key they own in any device. In addition, each user of the present invention may own one or more keys in the key table of their own device to handle their specific needs. Further, individual electronic devices within the communications network may incorporate any combination of producer, distributor, receiver and administrator functionality within a single unit so that a single node may embody whatever functionality is deemed appropriate.

In summary, the geo-encryption methods of the present invention extend the conventional methods of encryption to location-based and path-based encryption. If encrypted data is acquired at an unauthorized location or from an unauthorized channel through interception, transmission, or downloading, it cannot be decrypted because the location information pertaining to this unauthorized location would be inconsistent with the encrypted data. Further, if a device containing ciphertext is moved to a new, unauthorized location, it will not be possible to decrypt the ciphertext even if the device has the correct keys. It should be understood, however, that data could be securely moved between locations by authorized persons by re-encrypting or re-locking the random data encryption key for the new location. In order to compromise the geo-encryption, an adversary would have to know the encryption methods, location, and secret keys. Security ultimately depends on keeping the keys secret, since the methods and location may become known.

It should be appreciated that geo-encryption can be used even when location is not to be a factor in granting access. In that case, the encryption is made for a universal location that includes the entire world. This permits decryption anywhere in the world provided the receiver has the key decrypting key needed to decrypt the random data encrypting key. It also should be appreciated that geo-encryption can be used when time is not to be factor in granting access, thereby permitting decryption over an indefinite period of time.

A more complete understanding of the system and method for delivering encrypted information in a communication network using location identity and key tables will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 11 is a diagram illustrating the operation of an exemplary Export Key and Import New Key functions.

DETAILED DESCRIPTION OF THE PREFERRED EMBODIMENT

Figure 1:
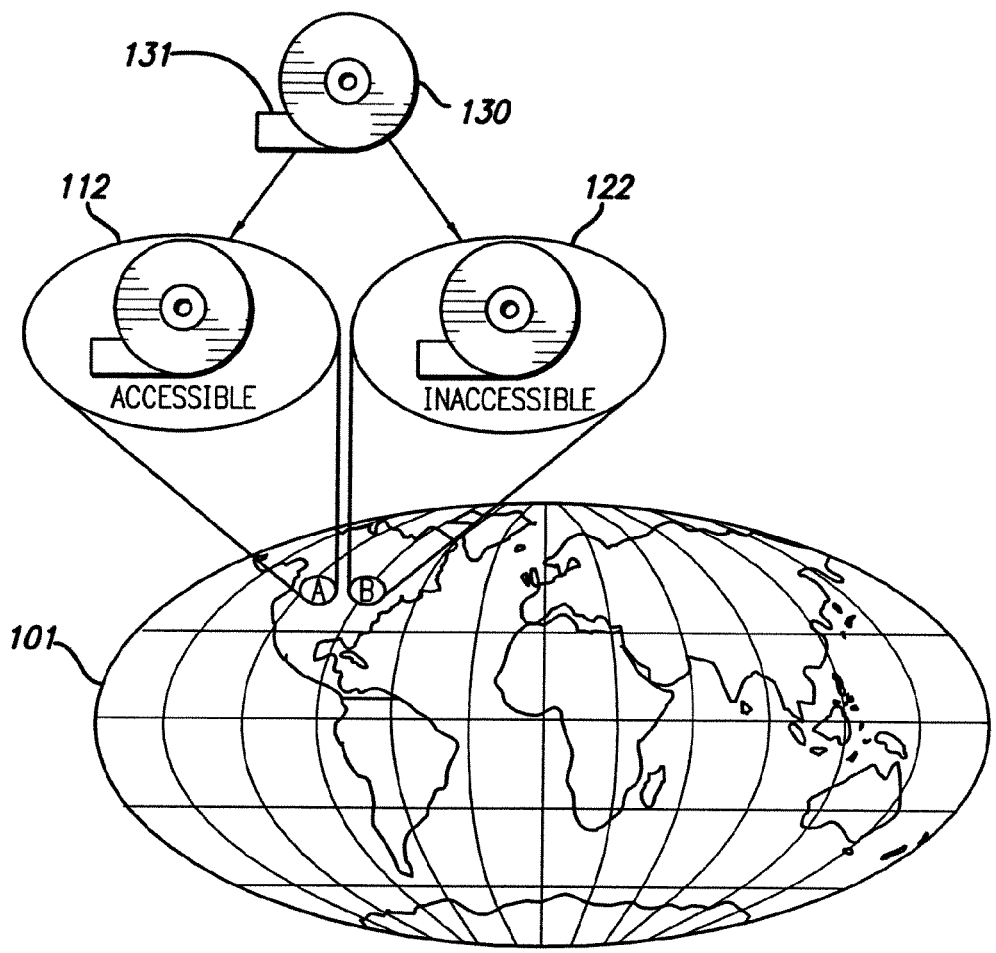
FIG. 1 is a schematic drawing illustrating access to digital information determined by location identity in accordance with an embodiment of the present invention.

The present invention satisfies the need to control the secure interchange of digital data so as to prevent unauthorized access to the data. More specifically, the present invention provides methods and apparatus for encrypting digital data in such a manner that it can be decrypted only at a specified location within a specified time frame and with a secret key. In the detailed description that follows, like element numerals are used to describe like elements illustrated in one or more of the figures. Various terms are used throughout the detailed description, including the following:

Administrator Device. A form of provider device (defined below) utilized by administrators of the keys stored in other devices.

Associating Location Identity. A method of marking digital data encryption keys with a location identity attribute.

Coordinate System. Location will be designated by latitude and longitude which is a coordinate system based on degrees that uniquely identifies any location on the Earth. Latitude is measured as an angle from the equator of the Earth (0 degrees) to the North Pole (90 degrees North) or to the South Pole (90 degrees South). Circles that run parallel to the plane of the equator form lines of latitude. All whole number latitude lines are equidistant from each other. A location's latitude is a measure of the angle between the plane of the equator and lines projected from the center of the Earth. Longitude lines are made by great circles that intersect with both the North and South Poles. Each longitude can be thought of as dividing the Earth in half. Longitudes are measured in half circles of 0 degrees to 180 degrees East and from 0 degrees to 180 degrees West from the Royal Greenwich Observatory in Greenwich, England. The 0 degree longitude line is also referred to as the prime meridian. A location's longitude is a measure of the angle between the plane made by its great circle and the prime meridian.

Distributor Device. A type of provider device (defined below) utilized by distributors of digital data.

Enforcing Location Identity. A method of providing or denying access to digital information through its associated location identity attribute.

Geocode. A unique coding of a location on earth usually associated with a coordinate system. Some geocodes identify a point location, such as when a place is identified by its latitude and longitude. Other geocodes may identify a region such as a zip code.

Geo-encrypt. An enforced association between a geographic area defined by a location identity attribute and digital data where access is granted to users within an area defined by the location identity attribute who also hold a secret key.

Geo-encrypted Data. Digital data containing encryption keys that have been associated with a location identity attribute, and that can only be accessed within an area defined by the location identity attribute using a secret key.

Location. A geographic place including, but not limited to, a precise point location, an area or region location, a point location included within a proximate area, or combinations of places on earth. Location can also include height (or altitude) to identify position above or below the surface of the earth, or time to identify position in a temporal dimension.

Location Identity. A precise coding of a location including, but not limited to, an attribute of information to precisely define the location at which the information is to be accessed. Location identity may be a coding of a point location, a region, a region with an associated point location, a corridor (i.e., center line with length on either side of the center line), or by any other precise identification of a location in space and time.

Location Variance. The minimum resolution at which a geocode of a location may fail to exactly distinguish it from adjacent locations.

Playback Location. The location portion of the location identity attribute at which access to digital information will be allowed.

Player Location. The location of a receiver device attempting to play back a geolocked file.

Producer Device. A form of provider device (defined below) utilized by producers of digital data.

Provider Device. Electronic devices, systems, networks, and the like with the minimum capacity to geo-encrypt and transmit digital data.

Proximity. A zone or area that includes the location.

Receiver Device. Electronic devices, systems, networks, and the like with the minimum capacity to receive and geo-decrypt digital data and keys, and to acquire location information. These electronic devices will often include a processing capability to execute program instructions and a memory capacity for short-term and long-term data storage, and may further include the ability to transmit information.

Universal Location. Any geographic place on earth.

The foregoing definitions are not intended to limit the scope of the present invention, but rather are intended to clarify terms that are used in describing the present invention. It should be appreciated that the defined terms may also have other meanings to persons having ordinary skill in the art. These and other terms are used in the detailed description below.

Referring now to FIG. 1, a schematic illustration of the present invention depicts how access to digital data is determined by location identity. As defined above, location identity refers to an attribute of information that precisely determines the geographic area or region in which the information is accessible. Two geographic areas denoted by A and B are shown on a map 101 within the continental United States. Information 130 is represented in digital format, and has an associated location identity attribute 131 that precisely defines the geographic area A as the region in which the digital information can be accessed. If a receiver device 112 is located within the geographic region A, then the digital information 130 will be accessible by the receiver device. Conversely, if a receiver device 122 is located within the geographic region B (or anywhere else besides geographic region A), then the digital information 130 will not be accessible. Location identity thus represents an attribute of digital information that determines the precise geographic region within which the information can be accessed. Digital data having location-based encryption keys are termed "geo-encrypted" and systems that enforce location identity geolock the associated digital data to the geographic region defined by the location identity attribute.

Figure 2:
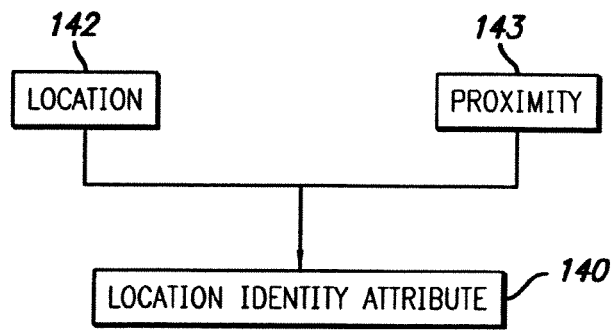
FIG. 2 is a block diagram illustrating components of a location identity attribute.

FIG. 2 depicts a location identity attribute 140 as comprising two items of information: (a) a location value 142, and (b) a proximity value 143. The location value 142 corresponds to the unique geographic position of a particular place. Many different coordinate systems, such as latitude and longitude, have been developed that provide unique numerical identification of any location on earth. For the purposes of this invention, any coordinate system that uniquely identifies a place can be used for the location value 142 of the location identity attribute 140. The proximity value 143 corresponds to the extent of a zone or area that encompasses the location. The location identity attribute 140 may comprise a point location or an exact location if the proximity value 143 is set to zero, null, empty, etc., or some other value indicating that the area referred to by the location identity attribute is a unique point location. It should be appreciated that the proximity value 143 is different from location variance. The proximity value 143 refers to a representation of an area or region, whereas location variance is the minimum resolution at which a geocode or a location may fail to exactly distinguish it from an adjacent location.

Figure 3:
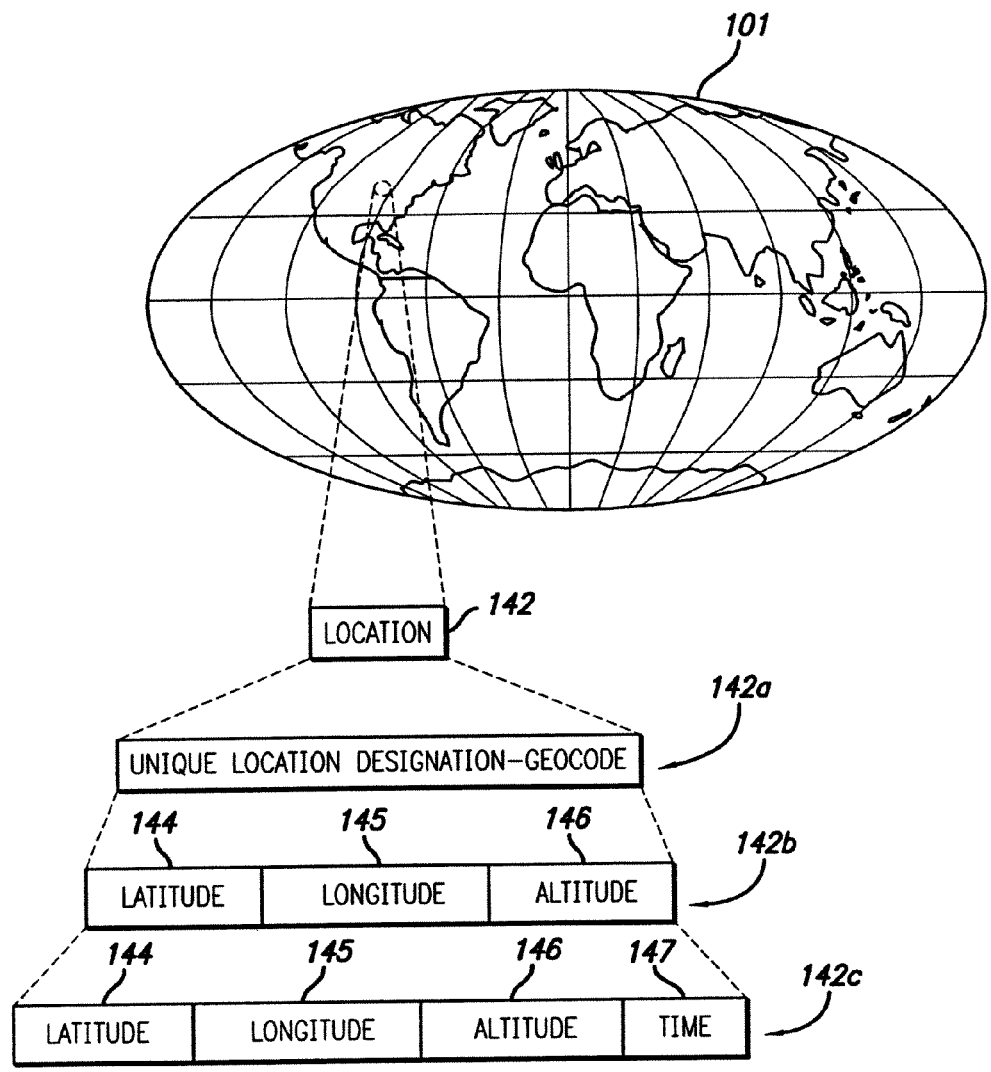
FIG. 3 is a block diagram illustrating components of a location value of the location identity attribute.

FIG. 3 depicts the location value 142 in greater detail. As noted above, there are numerous different coordinate systems in common use that provide a set of numbers that uniquely identify every location within the coordinate system. In the present invention, the location value 142 is defined in terms of a unique location designation or geocode as shown at 142a. Latitude 144 and longitude 145 using a conventional coordinate system may then further define the geocode. Other known systems, such as the Earth Centered, Earth Fixed Cartesian coordinate system, Universal Transverse Mercator (UTM), Military Grid Reference System (MGRS), World Geographic Reference System (GEOREF) etc., could also be advantageously utilized. In addition to latitude 144 and longitude 145, the location value could further include an altitude 146 as shown at 142b, which corresponds to the height of the location above sea level. Alternatively, the location value could further include a time value 147 as shown at 142c that may be defined in terms of a date and/or time range. This allows the definition of location identity to consider both geographic and/or temporal access to information.

Any geographic region or area that contains the location value 142 of the location identity can serve as the proximity value 143 for the location identity attribute 140. The proximity value 143 may comprise a rectangular region defined by two adjacent longitude lines (providing horizontal edges) and two adjacent latitude lines (providing vertical edges). Alternatively, the proximity value 143 may comprise a circular region represented by a single number defining the radius around the location. The circular region can be further defined as an elliptical area either centered at the location, or a circular or elliptical area that contains the location but not necessarily as the centroid. In another alternative, the proximity value 143 may comprise an irregular closed polygon, or a corridor. In yet another alternative, the proximity value 143 may correspond to a known geographic region, such as the country of Brazil. Other types of known geographic regions that can define the proximity value 143 can include postal zip codes, states, counties, incorporated cities, etc.

Figure 4A:
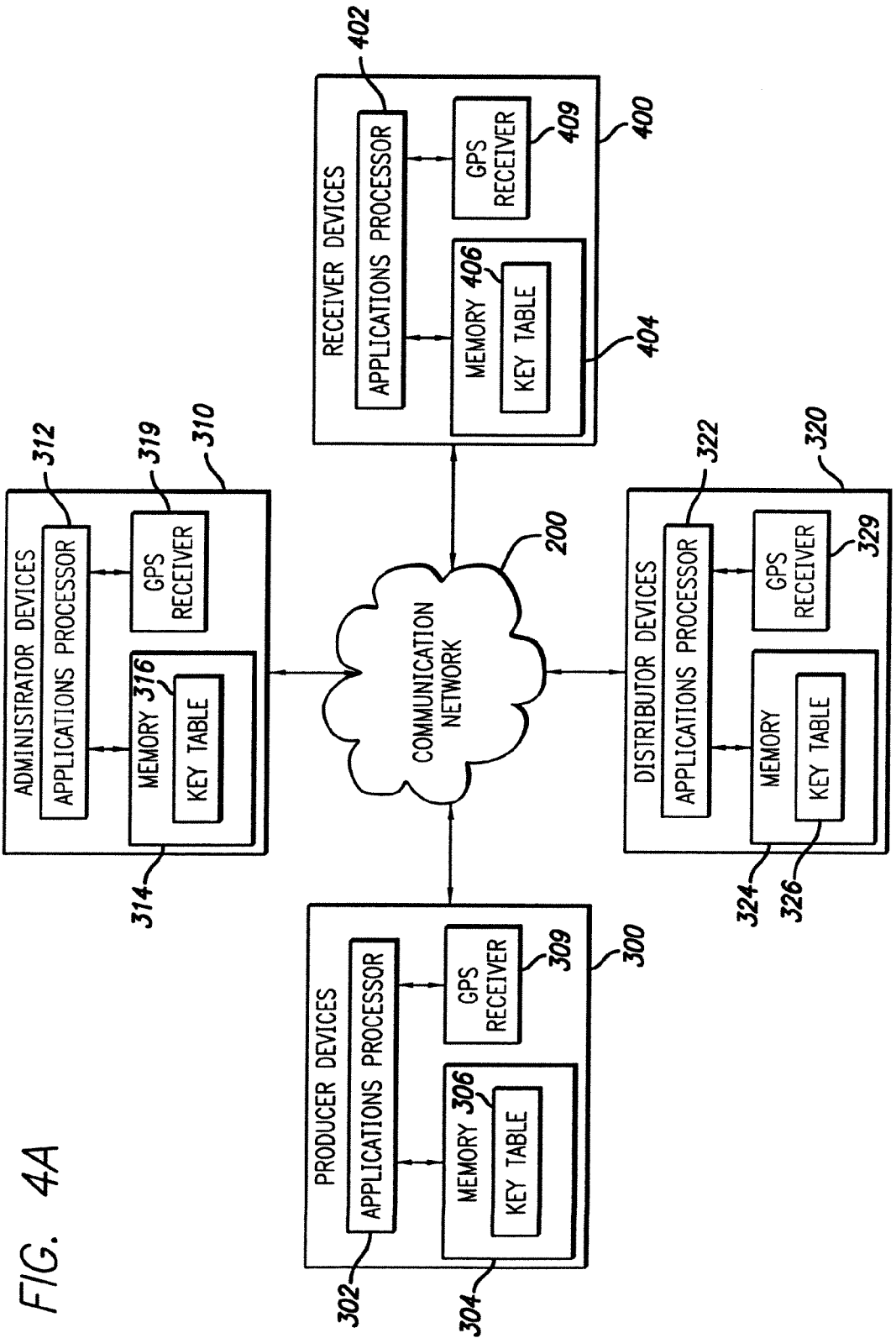
FIG. 4A is a block diagram illustrating an embodiment of a communications network in accordance with the invention.

Referring now to FIG. 4A, a block diagram illustrating an embodiment of a communications network employing methods and apparatus according to the invention. The communications network includes one or more producer devices 300, one or more receiver devices 400, and one or more administrator devices 310 that are coupled together via a network 200 (e.g., a wide area network such as the Internet). The producer devices 300 each denote a communication system utilized by a producer of digital data, such as a video production facility. The receiver devices 400 each denote a communications system utilized by an end user, such as a television set-top-box. The administrator devices 310 each denote a communication system utilized by an administrator of the communication network. As illustrated, producer devices 300, administrator devices 310, and receiver devices 400 are each respectively comprised of applications processors 302, 312, 402 and memory units 304, 314, 404. It should be appreciated that there may be a plurality of producer devices 300, administrator devices 310, and receiver devices 400 within the communication network, and that the network would also be functional with just a single device in any one of the categories.

The communications network may be configured with the producer devices 300 in direct communication with the receiver devices 400. Alternatively, one or more distributor devices 320 may also be connected to the aforementioned communications network interposed between the producer devices 300 and the receiver devices 400. In this alternative configuration, information communicated from the producer devices 300 to the receiver devices 400 passes through the distributor devices 320. As illustrated, distributor devices 320 are each comprised of an applications processor 322 and a memory unit 324. In the description that follows, the term "provider device" is used to collectively refer to producer devices 300, administrator devices 310, and distributor devices 320 unless specified otherwise. Moreover, the manner in which the producer devices 300, receiver devices 400, administrative devices 310 and distributor devices 310 communicate is not critical to the invention, and any form of communication network having some or all of these components could be advantageously utilized. Further, communications from provider devices may be point-to-point to specific receiver devices or multicast to plural receiver devices simultaneously.

The producer devices 300, administrator devices 310, distributor devices 320 and receiver devices 400 also include respective GPS receivers 309, 319, 329, 409 coupled to respective applications processors 302, 312, 322, 402. Specifically, it is anticipated that each of the devices has access to GPS signals and the respective GPS receivers can process those signals to produce location information, including latitude, longitude, altitude, and time, although all of these values may not be used. The receiver devices 400 (and in some cases the distributor devices 320) use the location information processed by the GPS receivers 409 to determine location identity information (discussed below). The other devices use the GPS receivers to seed the generation of random numbers used in the encryption process (also described below). It should be appreciated that other methods of determining location identity information and/or generating random numbers could also be advantageously utilized as well known in the art.

The respective memory units 304, 314, 324, and 404, of the producer devices 300, administrator devices 310, distributor devices 320, and receiver devices 400 may further comprise volatile and/or non-volatile memory components sufficient to store data, including information content, software instructions, and encryption keys. In a preferred embodiment of the invention, the memory units 304, 314, 324, and 404 are further organized to include key tables 306, 316, 326, and 406 that allow for the storage of a plurality of keys that are used with private-key and public-key cryptography. These keys are used by each device 300, 310, 320, and 400 together with location information to encrypt and decrypt random data encryption keys and to sign and validate messages. The use and distribution of the keys within the key tables is an important aspect of the invention that will be described in greater detail below.

It should be appreciated that any of the producer devices 300, administrator devices 310, distributor devices 320, and/or receiver devices 400 can be implemented in hardware or software. The preferred embodiment is a tamperproof hardware device that would protect both the secrecy of keys and the integrity of the functions performed by the devices; however, the functions themselves do not have to be kept secret. The devices further may be included in larger systems or devices that handle the communications and perform other application-related functions and auditing functions. Auditing functions might log the use of the device and, possibly, transmit that information to a designated auditing entity.

For example, in one embodiment, a receiver device 400 might be included in a set-top-box (STB) used by video service providers to receive broadcast entertainment content (e.g., television shows, movies, and other video programming). Whenever a program is decrypted, an audit record could be returned to the provider of the program. The STB would have the capability to show a decrypted program on the monitor, but not to save or transmit the plaintext. In another embodiment, a receiver device 400 might be built into the equipment used at a movie theater. The equipment might have the capability to show a decrypted program and store the content for a limited period of time, but not to transmit the plaintext. A provider device 300, 310, 320 might be built into a computer system or such other equipment that is used to create, process, and transmit data.

In accordance with an embodiment of the present invention, the provider devices 300, 310, 320 need to know the location of the receiver devices 400 (or other ones of the provider devices). The provider devices 300, 310, 320 may query the receiver devices 400 upon connection to the communication network, which then report back the location information derived from GPS signals (or other method) to the provider devices. Alternatively, in the foregoing example, the video service providers may already know the location of the set-top-boxes since they correspond to the physical address of customers of the video service providers. Each set-top-box may further include a unique serial number that the provider devices 300, 310, 320 can use to identify the receiver devices 400.

Figure 4B:
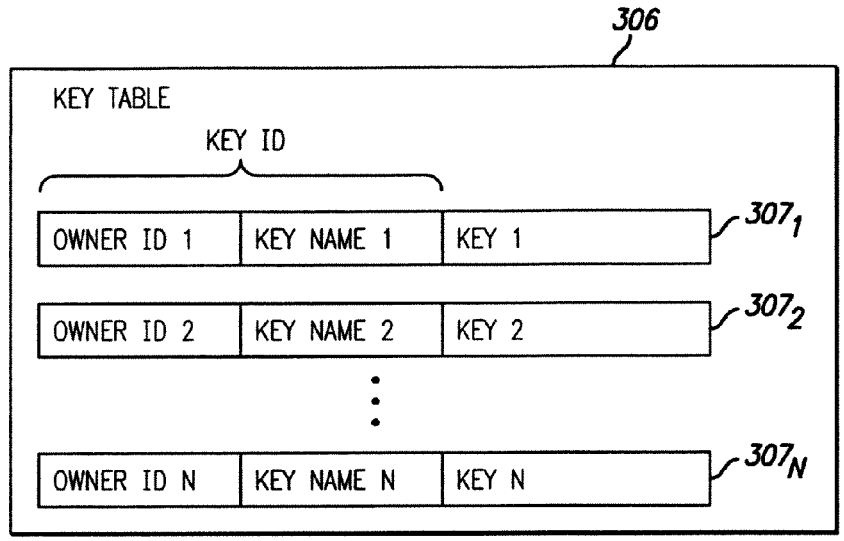
FIG. 4B is a block diagram illustrating an exemplary key table.

In a preferred embodiment, the key tables 306, 316, 326, 406 contain the keys that each respective device uses to encrypt or decrypt random data encryption keys and to sign or validate messages. As shown in FIG. 4B, an exemplary key table 306 contains a plurality of key records $307_1$-$307_N$. The key records 307 (also referred to herein simply as "keys") each include a unique key identification (ID) that further comprises an Owner Identification (ID) code and a key name. The key records 307 further include the associated key value (illustrated as KEY 1 through KEY N). Every key in the table has an owner that is determined by the corresponding Owner ID. The key name simply gives the name of the key while the key value gives the actual string of bits comprising the key. It should be understood that the key records 307 might also contain other information, including the type of key and encryption method used with that key. For example, the key record 307 could specify whether the key is to be used with private-key cryptography or public-key cryptography, and, if the latter, whether the key is a public-key encrypting key, private-key decrypting key, private signature key, or public signature validation key. The key records 307 might also contain an expiration date. The key records 307 for the public and private keys used with public-key cryptography might include digital certificates for the keys. Some of this additional information may be part of the key identification. The other key tables 316, 326, 406 will have generally similar construction.

For example, the keys used by a television producer (e.g., AOL-Time Warner, Inc.) to protect the data it produces for television viewing could have key IDs with an owner ID uniquely identifying this particular television producer as well as a plurality of key names, each of which uniquely identifies a particular channel or network owned by the television producer (e.g., HBO®, TNT®, TBS®, CARTOON NETWORK®, CNN®, CINEMAX®, etc.). Similarly, another television producer (e.g., The Walt Disney Co.) could have key IDs with an owner ID unique to this particular television producer along with key names corresponding to particular channels or networks owned by this other television producer (e.g., Disney Channel®, ESPN®, ABC®, etc.).

In an embodiment of the invention, administrators will own at least one key in the key table of every device. It should be appreciated that these keys could be unique to individual devices or common among multiple devices. One of these keys might be common to all devices, allowing any provider device 300, 310, 320 to transmit encrypted data to any receiver device 400. In addition, a provider of geo-encrypted data may own one or more keys in the key tables of devices that are allowed to receive and decrypt data from that provider. In another embodiment, each device 300, 310, 320, 400 might own its own public-private key pair. The public key of the exemplary device could be given to any provider device, allowing the provider device to transmit encrypted data to the exemplary device without the need for a common key. It should be appreciated that many possible arrangements of keys are possible.

The keys in the key table are used to protect the transmission of data encryption keys. Specifically, they are used with location information to encrypt and decrypt the data encryption key and to sign and validate data. It should be appreciated that secret keys in the key tables 306, 316, 326, 406 would remain within the associated device while in use and would never leave the device in unencrypted form. The key table could be organized in any way, for example, as a sequential or linked list, binary search tree, or hash table. It also could be implemented as a database or other type of data repository. Secret keys cannot be exported from the device in the clear, but they can be exported in encrypted form. Operations for adding, changing, and deleting keys to/from a key table will be described later. It should be appreciated that in any given device keys could be distributed over multiple key tables or not even stored in a table per se. Accordingly, the key tables described herein are intended to denote the entire collection of keys within a device in any manner in which they are stored, maintained and/or organized.

Figure 5:
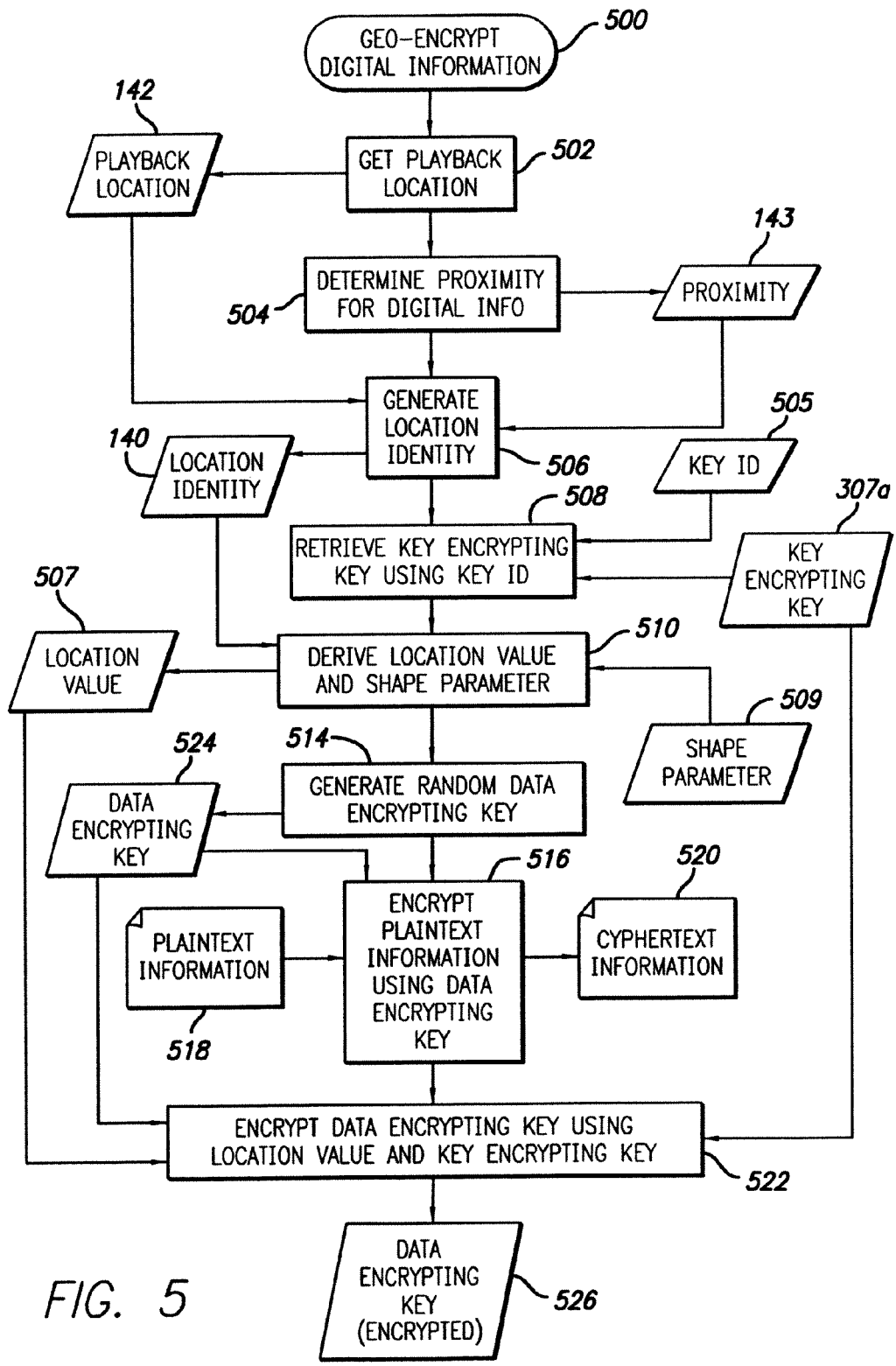
FIG. 5 is a flowchart illustrating a method for geo-encrypting digital information using a location identity attribute.

In a preferred embodiment, digital data is geo-encrypted using a set of functions embedded within a provider device 300, 310, 320. This geo-encrypted data is then transmitted to one or more receiver devices 400 where it is decrypted using a set of functions embedded within the receiver device 400. The transmission can be point-to-point, broadcast or multicast. The geo-encrypted data has a location identity attribute 140 associated therewith so that subsequent access of the digital information is limited to the geographic area specified by the location identity attribute 140. FIG. 5 illustrates a general method for associating digital information with the location identity attribute 140 that precisely defines the region in which access or playback of the digital information will be allowed. In the present invention, this method would be performed either via a producer device 300, an administrator device 310 or a distributor device 320.

More particularly, the method starts at step 500 with a command to geo-encrypt digital information using a location identity attribute. A first part of the method provides for the generation of the location identity attribute. At step 502, a playback location value 142 for the digital information is retrieved and stored for later use. The playback location value 142 is not the geographical location at which the method is performed by the provider device 300, 310, 320, but rather corresponds to the geographical location for a receiver device 400 at which access to the digital information will be allowed. At step 504, a proximity value 143 of the location identity attribute of the receiver device 400 is retrieved and stored for later use. Various methods for generating the location and proximity values 142, 143 will be described in greater detail below. In addition to such methods, the location and proximity values 142, 143 may also be pre-stored and retrieved from memory, or the end user may be queried to provide the information. At step 506, the playback location and proximity values 142, 143 are used to generate the location identity attribute 140.

A second part of the method provides for the generation of encryption keys and the encryption of the plaintext digital information. At step 508, a key ID 505 is used to select and retrieve a key encrypting key 307a from the key table of the corresponding provider device 300, 310, 320. The location identity 140 is then used at step 510 to derive a location value 507 and a shape parameter 509. The shape parameter 509 defines a shape of an area of interest without identifying the specific location corresponding to the area of interest. The shape parameter 509 is a locationless translation of the proximity portion of the location identity attribute 140. Locationless refers to the characteristic of the shape parameter 509 as defining the shape of a proximate area without reference to any actual location. As will be further described below, the receiver device 400 uses the shape parameter 509 to fully determine the location value needed for recovering the location key.

Then, at step 514, the process generates a random data encrypting key 524. This data encrypting key 524 is used to encrypt the plaintext digital information 518 at step 516 to produce geo-encrypted digital information 520. The data encrypting key 524 is then encrypted at step 522 using the location value 507 and the key encrypting key 307a. The geo-encrypted digital information 520, the encrypted data encrypting key 526 (also referred to below as a cipher key), the shape parameter 509, and the key ID 505 are then communicated to the receiver device 400. Attempts to decrypt the geo-encrypted information 520 by a receiver device 400 will be denied unless the location of the receiver device 400 matches the location specified by the location identity attribute 140 and the receiver device 400 has the correct key decrypting key identified by the key ID 505.

Figure 6:
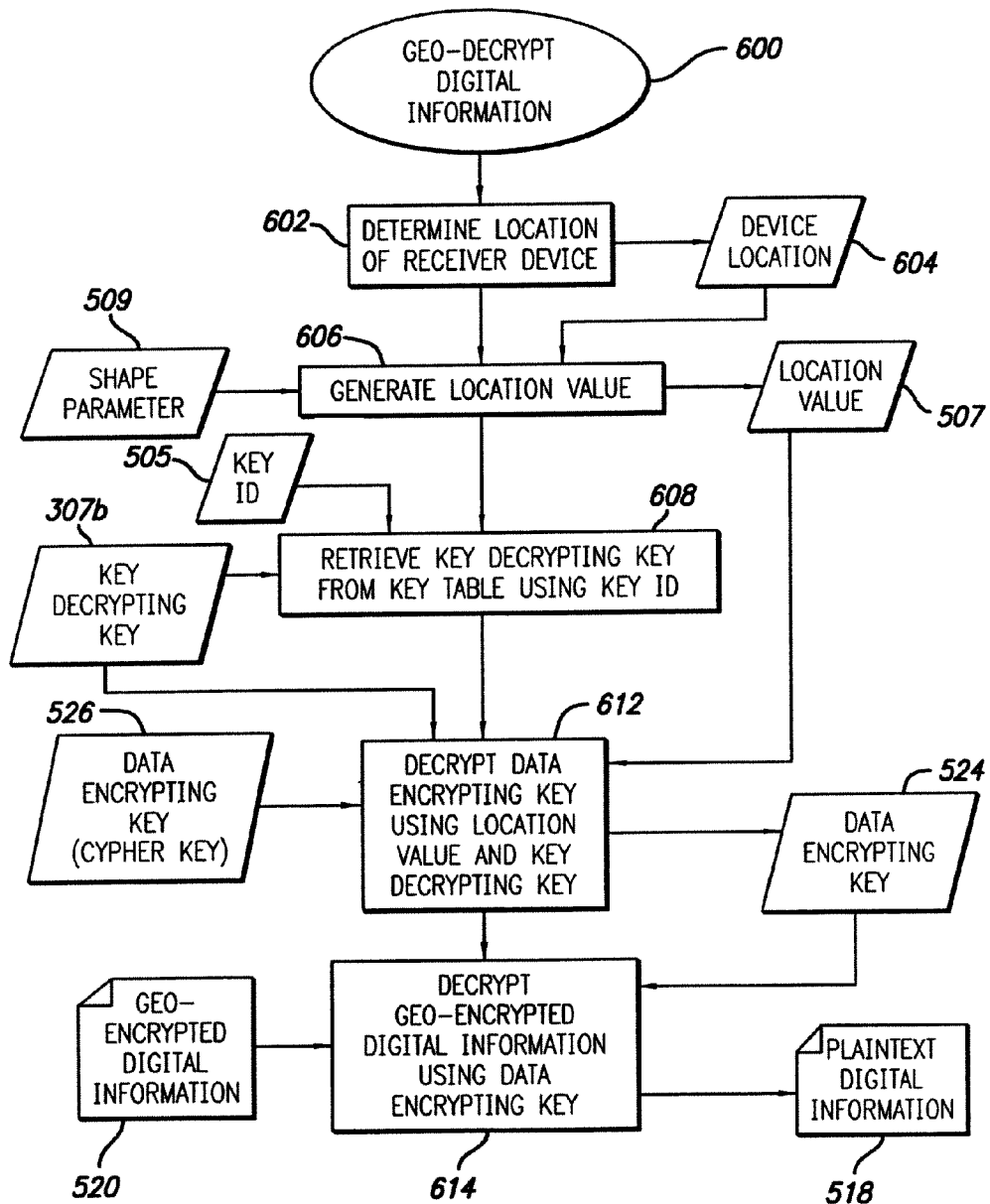
FIG. 6 is a flowchart illustrating a method for accessing geo-encrypted digital information using the location identity attribute.

FIG. 6 shows a general method for enforcing access to geo-encrypted digital information by location. Software or embedded firmware instructions operating in association with the applications processor 402 of the receiver device 400 would cause the method to be performed. Particularly, the method starts at step 600 with a command to decrypt the geo-encrypted digital information 520. A first part of the method provides for the generation of the location value 507. At step 602, the method determines the location of the receiver device. It should be appreciated that numerous ways to determine the receiver device location are possible and are described in the aforementioned co-pending patent applications commonly owned by the applicant. In a preferred embodiment, the GPS receiver 409 within or coupled to the receiver device 400 provides this location information 604. The device location information 604 is then used in conjunction with the shape parameter 509 received from the provider of the geo-encrypted digital information to generate the location value 507 at step 606. As will be appreciated, the location value 507 generated by the receiver device must match the location value 507 used by the provider device to geo-encrypt the digital information, otherwise the receiver device 400 will be unable to geo-decrypt the encrypted digital information 520.

In a second part of the method, the location value 507 is used with a key decrypting key 307b to geo-decrypt the encrypted digital information. The key decrypting key 307b is retrieved from the key table of the receiver device at step 608 in accordance with the key ID 505 received from the provider device. It should be appreciated that the key decrypting key 307b retrieved at step 608 must correspond to the key encrypting key 307a used in geo-encrypting the digital information; otherwise, the geo-decryption will fail. At step 612, the selected key decrypting key 307b and the generated location value 507 are used to decrypt the data encrypting key 526. If the location of the receiver device is consistent with the location value 507 used by the provider device, the decryption will recover the original data encrypting key 524. Lastly, the data encrypting key 524 is used to decrypt the geo-encrypted digital information 520 to recover the plaintext digital information 518 at step 614.

Table 1 provided below lists an exemplary set of functions used in an embodiment of the present invention. It should be appreciated that these functions can be incorporated into one or more of the aforementioned producer devices 300, administrator devices 310, distributor devices 320, and receiver devices 400. For each such function, Table 1 lists the values used as inputs (i.e., parameters) to the function and the corresponding values produced as outputs (i.e., results) of the function. It should be appreciated that all functions using cryptography in Table 1 use location information in some way. It should be further appreciated that these functions do not necessarily have to be implemented as separate procedures or distinct program units of any type, and could instead be combined or split into multiple units. It should also be noted that the inputs and outputs shown in Table 1 are not necessarily external to a device and may instead be passed from one function to another within a single device. All of the functions described herein could further include error checking and handling, and it is anticipated that conventional methods for performing these functions be utilized. A brief description of each function listed in Table 1 is provided with greater detail within the text below.

TABLE 1

Basic Functions

| Function | Inputs/ Parameters | Outputs/ Results | Description |
|---|---|---|---|
| Geo-Encrypt | Location ID, Key ID, Plaintext | Shape Parm, Cipher Key, IV, Ciphertext | Encrypt data and lock the data encryption key using a location-derived secret key |
| Geo-Decrypt | Shape Parm, Key ID, Cipher Key, IV, Ciphertext | Plaintext | Decrypt data after unlocking the key |
| Geo-Lock Key | Location ID, Key ID, Data Encrypting Key | Shape Parm, Cipher Key | Lock data encryption key with location-derived secret key |
| Geo-Unlock Key | Shape Parm, Key ID, Cipher Key | Data Encrypting Key | Unlock data encryption key with location-derived secret key |
| Geo-Relock Key | Shape Parm In, Key ID In, Cipher Key In, Location ID Out, Key ID Out | Shape Parm Out, Cipher Key Out | Unlock data encryption key with one location-derived secret key and lock it with another |
| Geo-Relay Encrypt | n, Location ID [j] for j from 1 to n, Key ID [j] for j from 1 to n, Plaintext | Shape Parm [j] for j to 1 to n, Cipher Key, IV, Ciphertext | Encrypt data and lock the data encryption key with multiple locks that must be unlocked by successive relay stations before the data can be decrypted |
| Create Key | Key ID | | Create and add |

TABLE 1-continued

Basic Functions

| Function | Inputs/ Parameters | Outputs/ Results | Description |
|---|---|---|---|
| Replace Key Delete Key | | | secret key to Key Table, replace key with new value, or delete key |
| Export Key | Key ID, Location ID, Export Key ID | Shape Parm, Cipher Key, IV, Cipher Key Record, Signature | Geo-encrypt a key record in the Key Table so that it can be securely exported to another Key Table |
| Import New Key Import Replacement Key Import Deletion Key | Shape Parm, Export Key ID, Cipher Key, IV, Cipher Key Record, Provider ID, Signature | | Add, change, or delete a key record in the Key Table by importing a geo-encrypted key record and performing the operation only if signed by the owner or by an administrator |

As described above, the provider devices 300, 310, 320 include a key table 306, 316, 326 and a private key 308, 318, 328, respectively, and may receive a GPS signal as an input used to derive location information for decryption and to generate random values. The provider devices are adapted to execute a first set of functions, including Geo-Encrypt, Geo-Lock Key, Geo-Unlock Key, Geo-Relay Encrypt, and Geo-Relock Key. The provider devices may also be adapted to execute a second set of functions, including Create Key, Replace Key, Delete Key, Export Key, Import New Key, Import Replacement Key, and Import Deletion Key. The first set of functions are used to manage the encryption and decryption of information using the keys contained in the key table, and the second set of functions are used to manage the various key values in the key tables. In a preferred embodiment of the invention, the provider devices 300, 310, 320 include all of the functions identified in Table 1, the operation of which will be discussed in greater detail below.

The receiver devices 400 also include a key table 406 and receive a GPS signal as input. In a preferred embodiment, the receiver devices 400 contain only functions needed to decrypt geo-encrypted data and receive keys. In particular, receiver devices 400 are adapted to execute the Geo-Decrypt and Geo-Unlock functions. The receiver devices may also be adapted to execute the Import New Key, Import Replacement Key, and Import Deletion Key functions. These functions enable users to receive and decrypt geo-encrypted data and keys, but not to geo-encrypt data or keys. The operation of these functions will also be discussed in greater detail below.

It should be appreciated that other combinations of functions are possible. For example, a distributor device 320 could be given somewhat different functionality from that of a producer device 300. Or, a single provider device 300, 310, 320 might be used by all entities that produce, distribute, and/or receive geo-encrypted data. If receiver devices 400 are to have the capability to geo-encrypt their own files and share them with other users, then they would likely need most, if not all, of the functionality of a provider device 300, 310, 320, including the capability to own their own keys and share keys with other devices. It should also be appreciated that the devices may include functions that are not described herein. They may have additional functions to manage the key tables, for example, to limit the number of keys that an owner can include in a key table or to allow an owner to determine which of its keys are included in a key table. The devices may further include functions providing additional capabilities associated with digital rights management.

Figure 7:
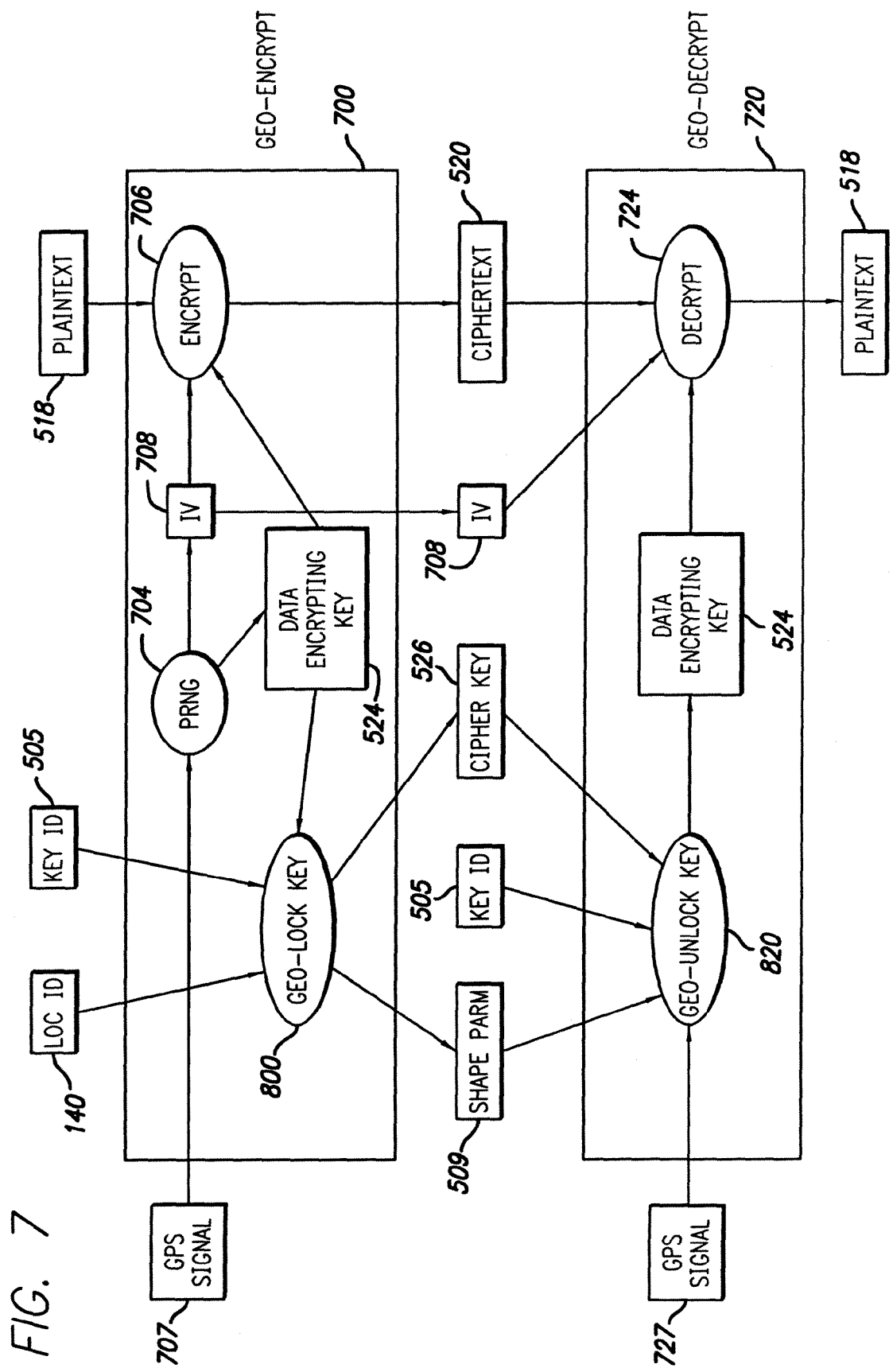
FIG. 7 is a diagram illustrating the operation of exemplary Geo-Encrypt and Geo-Decrypt functions.

The operation of the Geo-Encrypt and Geo-Decrypt functions 700, 720 are illustrated in FIG. 7 with reference to Table 1. The Geo-Encrypt function 700 has three inputs, including: (1) Location Identity (Loc ID) 140; (2) Key ID 505; and (3) Plaintext 518. The Geo-Encrypt function 700 encrypts the Plaintext 518 according to the location identified by Location ID 140 in such a manner that the data can be decrypted only by a device that both is at that location and has the secret key identified by the Key ID 505. As a result, the Geo-Encrypt function 700 yields four outputs, including: (1) Shape Parameter (Shape Parm) 509; (2) Cipher Key 526; (3) Initialization Value (IV) 708; and (4) Ciphertext 520. The Geo-Encrypt function 700 includes as sub-functions pseudo-random number generator (PRNG) 704 and Encrypt 706, and also accesses the Geo-Lock Key function 800 (described below with respect to FIG. 8).

More particularly, the Geo-Encrypt function 700 generates a Data Encrypting Key 524 using the PRNG sub-function 704. In a preferred embodiment, the PRNG sub-function 704 is provided with raw GPS signal data 707 in addition to other non-deterministic information (e.g., determined by the state of the device). Assuming an initialization value (IV) is to be used, the PRNG sub-function 704 also generates a random IV 708. The Encrypt sub-function 706 then encrypts the Plaintext 518 using both the Data Encrypting Key 524 and the IV 708 to produce a Ciphertext output 520. The Data Encrypting Key 524 is locked (i.e., encrypted) using the Geo-Lock Key function 800, using a location value derived from the location identified by the Location ID 140 and from the key encrypting key identified by the Key ID 505. The Geo-Lock Key function 800 provides as outputs Shape Parameter 509 and Cipher Key 526.

In a preferred embodiment, the Encrypt sub-function 706 comprises a strong encryption method, such as the Advanced Encryption Standard (AES), which has a block size of 128 bits and uses keys of size 128, 192, and 256 bits. It should be appreciated that any other method of encryption can also be used. The particular mode of encryption would depend on the algorithm, length of the Plaintext 518, and the application. Normally, when the Plaintext 518 is longer than a block or two, a mode such as output feedback, cipher feedback, or cipher block chaining is used. In that case, the encryption process uses the initialization vector (IV) 708 to initialize the encryption process. In a preferred embodiment, the IV 708 is transmitted to the receiver device 400 in order to initialize the decryption process. It should be noted, however, that the IV 708 does not have to be encrypted.

The Geo-Decrypt function 720 has five inputs, including: (1) Shape Parm 509; (2) Key ID 505; (3) Cipher Key 526; (4) IV 708; and (5) Ciphertext 520. The Geo-Decrypt function 720 decrypts Ciphertext 520 using Data Encrypting Key 524 and IV 708, and includes sub-function Decrypt 724 and accesses the Geo-Unlock Key function 820 (described below with respect to FIG. 8). Data Encrypting Key 524 is determined by unlocking the Cipher Key using the Geo-Unlock Key function 820. The Geo-Unlock Key function 820 decrypts the Cipher Key 526 using the key decrypting key identified by Key ID and a location value determined from the Shape Parm 509 and a GPS signal 727 in order to yield the Data Encrypting Key 524. The Decrypt sub-function 724 decrypts the Ciphertext 520 using the Data Encrypting Key 524 and IV 708 in order to reconstruct the Plaintext 518. It should be appreciated that the Decrypt sub-function 724 would be the inverse of the Encrypt sub-function 706 used by the Geo-Encrypt function 700 described above.

In an embodiment of the invention, the Geo-Decrypt function 720 goes further and tests whether the recovered Plaintext 518 is authentic. For example, this procedure may be done using a message authentication code (MAC) that would be computed by the Geo-Encrypt function 700 as a function of the Plaintext 518 and included with the data. It should be understood that any known method of computing a MAC could be used. After decrypting the Ciphertext 520, the Geo-Decrypt function 720 would then compute a MAC for the recovered Plaintext 518 If the MAC matches that computed by the Geo-Encrypt function 700 and included with the data, then it can be assumed that the data was correctly decrypted. This implies that the Geo-Decrypt function 720 was performed at the correct location and that it used the correct key decrypting key. If the MAC does not match, then the Geo-Decrypt function 720 could output an indicator to this effect. Alternatively, the Geo-Decrypt function 720 could take action that would henceforth render the data undecipherable. For example, the Geo-Decrypt function 720 could nullify the Cipher Key 526 by replacing it with all zeros. With this additional capability, the Geo-Decrypt function 720 can ensure that, if an attempt is made to decrypt data at an incorrect location or using an incorrect key decrypting key, any further attempts to decrypt the data will fail.

Figure 8:
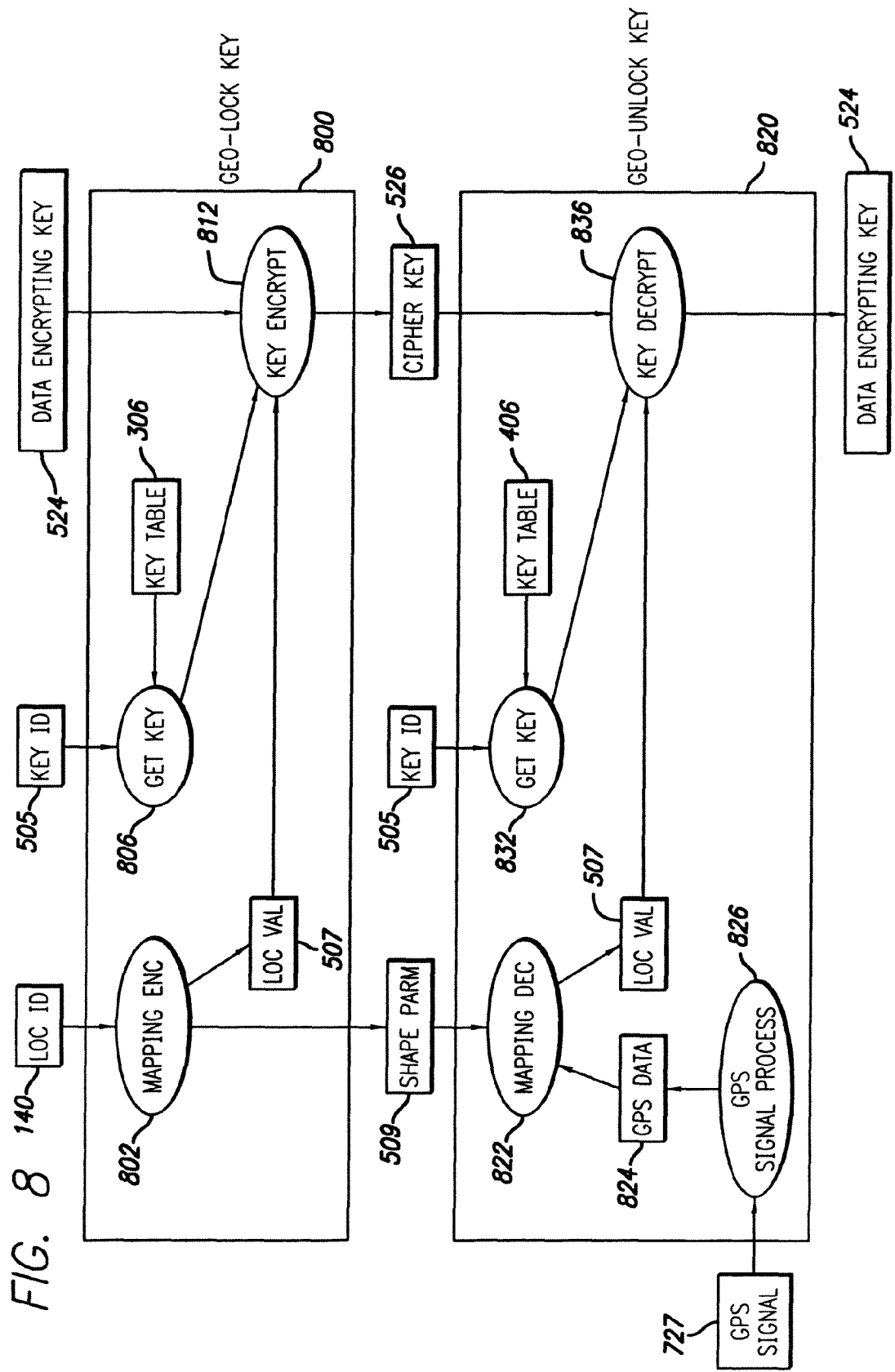
FIG. 8 is a diagram illustrating the operation of exemplary Geo-Lock Key and Geo-Unlock Key functions.

FIG. 8 illustrates the operation of the Geo-Lock Key and Geo-Unlock Key functions 800, 820 with reference to Table 1. The Geo-Lock Key function 800 is used to encrypt the Data Encrypting Key 524 so that it can be securely distributed to a receiver device 400. The Geo-Lock Key function 800 has three inputs, including: (1) Location ID (Loc ID) 140; (2) Key ID 505; and (3) Data Encrypting Key 524. The Geo-Lock Key function 800 further includes a Mapping Encrypt (Mapping Enc) sub-function 802, a Get Key sub-function 806, and a Key Encrypt sub-function 812. The Geo-Lock Key function generates two outputs, including: (1) Cipher Key 526; and (2) Shape Parm 509.

The Mapping Encrypt sub-function 802 converts the Location ID 140 into a Location Value (Loc Val) 507 and the Shape Parm 509. In a preferred embodiment, the Mapping Encrypt sub-function 802 comprises a mapping function such as that described in co-pending patent application Ser. No. 09/758,637 commonly owned by the applicant, incorporated by reference herein. Particularly, the mapping function is used to map different coordinates within a proximate area into the same values. The mapping function is as follows:

$$f(x) = \Delta * \text{int}(x/\Delta)$$

where int is a function that returns the integer part of its argument in parentheses. Using x as the latitude of the geocode location and $\Delta$ as the length of the side between the bounding latitudes; or x as the longitude of the geocode location and $\Delta$ as the length of the side between the bounding longitudes, a grid may be constructed over the entire latitude/longitude coordinate system. Every geocode within a grid cell will be transformed into the same value when the above function is applied to its latitude and longitude. Since the "great rectangle" boundaries may not fall directly on boundaries that are exact multiples of the length of the bounding sides, a locationless offset measure is calculated using the lower bounding side and is used to linearly shift the grid. It should be appreciated that other methods for computing Location Value 507 and Shape Parm 509 may also be employed within the scope and spirit of the present invention.

The Get Key sub-function 806 uses the Key ID 505 to retrieve the appropriate key encrypting key 307a from a key table 306. Then, the Key Encrypt sub-function 812 encrypts the Data Encrypting Key 524 using the Location Value 507 and the key encrypting key 307a. In a preferred embodiment, the Key Encrypt sub-function 812 first takes the exclusive-OR of the Data Encrypting Key 524 and the Location Value 507, and then encrypts the result using the key encrypting key 307a. The encryption would be implemented with a strong encryption method such as the AES if private-key encryption is being used or RSA if public-key encryption is being used, although it should be appreciated that other encryption methods could be used. In an alternative embodiment, the Key Encrypt sub-function 812 first encrypts the Location Value 507 with the key encrypting key 307a and then uses the result of that to encrypt the Data Encrypting Key 524. With this embodiment, the Key Encrypt sub-function 812 must use private-key cryptography.

It should be appreciated that the Geo-Lock Key function 800 can be used to encrypt any key, not just the Data Encrypting Key 524 used to encrypt the Plaintext data. For example, the Geo-Lock Key function 800 can be used to place an additional lock on an already encrypted key. Thus, the Data Encrypting Key 524 used by the Geo-Lock Key function 800 (and Geo-Unlock Key function 820) should be understood to refer to any key, whether already encrypted or not.

The Geo-Unlock Key function 820 is used to recover the Data Encrypting Key 524 from the Cipher Key 526. The Geo-Unlock Key function 820 has three inputs, including: (1) Shape Parm 509; (2) Key ID 505; and (3) Cipher Key 526. The Geo-Unlock Key function 820 further includes a Mapping Decrypt (Mapping Dec) sub-function 822, a GPS Signal Processing sub-function 826, a Get Key sub-function 832, and a Key Decrypt sub-function 836. The Geo-Unlock Key function 820 generates a single output, i.e., Data Encrypting Key 524.

The GPS Signal Processing sub-function 826 receives a GPS signal 727 and processes the signal to determine the location of the receiver device 400 in terms of GPS coordinate data 824. The Mapping Decrypt sub-function 822 uses the GPS data 824 along with the Shape Parm 509 to determine the Location Value 507. As described above, the Mapping Decrypt sub-function 822 employs a mapping function such as that described in co-pending patent application Ser. No. 09/758,637. It should be appreciated that different methods for computing Location Value 507 could also be used. The Get Key sub-function 832 operates substantially the same as the Get Key sub-function 806 described above. Particularly, the Get Key sub-function 832 uses the Key ID 505 to retrieve the appropriate key decrypting key 307b from a key table 406 of the receiver device 400. The Key Decrypt sub-function 836 decrypts the Cipher Key 526 using the Location Value 507 and the key decrypting key 307b to recover the Data Encrypting Key 524. It should be noted that the Key Decrypt sub-function 836 is substantially the inverse of the Key Encrypt sub-function 812 described above. In a preferred embodiment, the Key Decrypt sub-function 836 first decrypts the Cipher Key 526 using the key decrypting key 307b. This is performed using either private-key or public-key cryptography, depending on which was used by the Key Encrypt sub-function 812. The Key Decrypt sub-function 836 then takes the exclusive-OR of the result with the Location Value 507 to recover the Data Encrypting Key 524. In an alternative embodiment, the Key Decrypt sub-function 836 first encrypts the Location Value 507 with the key decrypting key 307b, and then uses the result to decrypt the Cipher Key 526 and recover the Data Encrypting Key 524. In this case, private-key cryptography is used for all steps, so the key decrypting key 307b is the same as the key encrypting key 307a. If the receiver device 400 does not have access to GPS signals either because it is not GPS-enabled or for some other reason, it should be appreciated that Location Value 507 may be set to a universal location. As a result, this will allow data intended for all locations to be decrypted from any location, but not other data.

When encrypted data (i.e., Ciphertext 520) is transmitted to a receiver device 400, it is transmitted along with a Cipher Key 526. The Cipher Key 526 contains the Data Encrypting Key 524 enciphered in a location-dependent manner. In a preferred embodiment, re-encryption would then involve deciphering (i.e., unlocking) the Data Encrypting Key 524 and re-enciphering (i.e., locking it with a different location value). It should be appreciated that the Ciphertext 520 itself is not decrypted and re-encrypted. Relay encryption is similar, except that the Cipher Key 526 is not initially unlocked. Instead, one or more additional locks are placed on top of the Cipher Key 526. Thus, the original key may be nested under several layers of encryption, all of which have to be removed in order to restore the original key. The specific functions used to perform these tasks are described in greater detail below.

Figure 9:
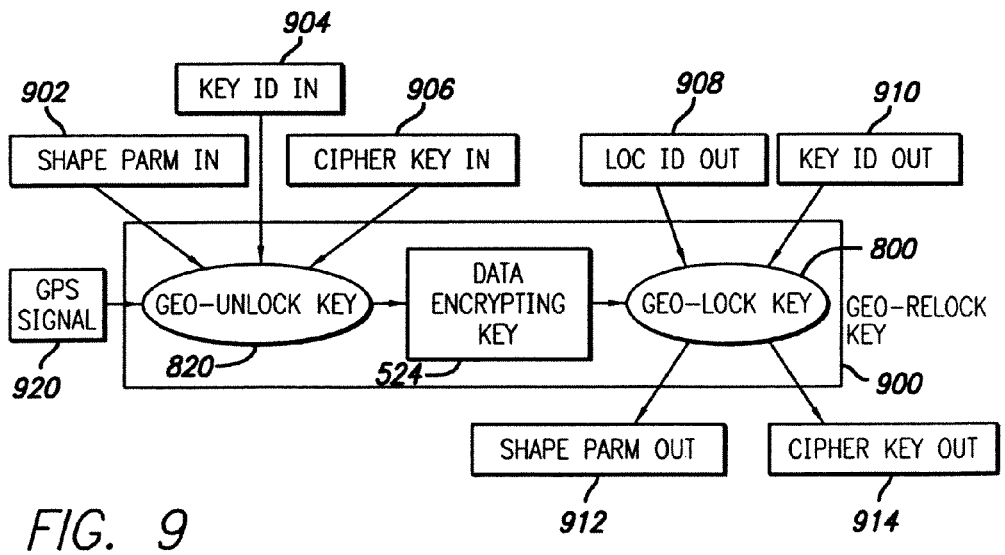
FIG. 9 is a diagram illustrating the operation of an exemplary Geo-Relock Key function.

FIG. 9 illustrates the operation of the Geo-Re lock Key function 900 with reference to Table 1. The Geo-Relock Key function 900 receives five inputs, including: (1) Shape Parm In 902; (2) Key ID In 904; (3) Cipher Key In 906; (4) Location ID Out 908; and (5) Key ID Out 910. The Geo-Relock Key function 900 also receives a GPS signal 920. The Geo-Relock Key function 900 produces two outputs, including: (1) Shape Parm Out 912; and (2) Cipher Key Out 914. The Geo-Relock Key function 900 accesses the Geo-Unlock Key function 820 (described above) and the Geo-Lock Key function 800 (described above). The Geo-Unlock Key function 820 decrypts the Cipher Key In 906 using Shape Parm In 902 and Key ID In 904 in order to recover the Data Encrypting Key 524. Then, the Geo-Lock Key function 800 re-encrypts Data Encrypting Key 524 using the new location value as determined by Location ID Out 908 and Key ID Out 910. It should be noted that the values for Key ID In and Key ID Out could be the same or different depending on whether a new key encrypting key 307a is to be used in the process. Similarly, the location values could be the same or different, depending on whether decryption is to take place at the same or different location.

Figure 10:
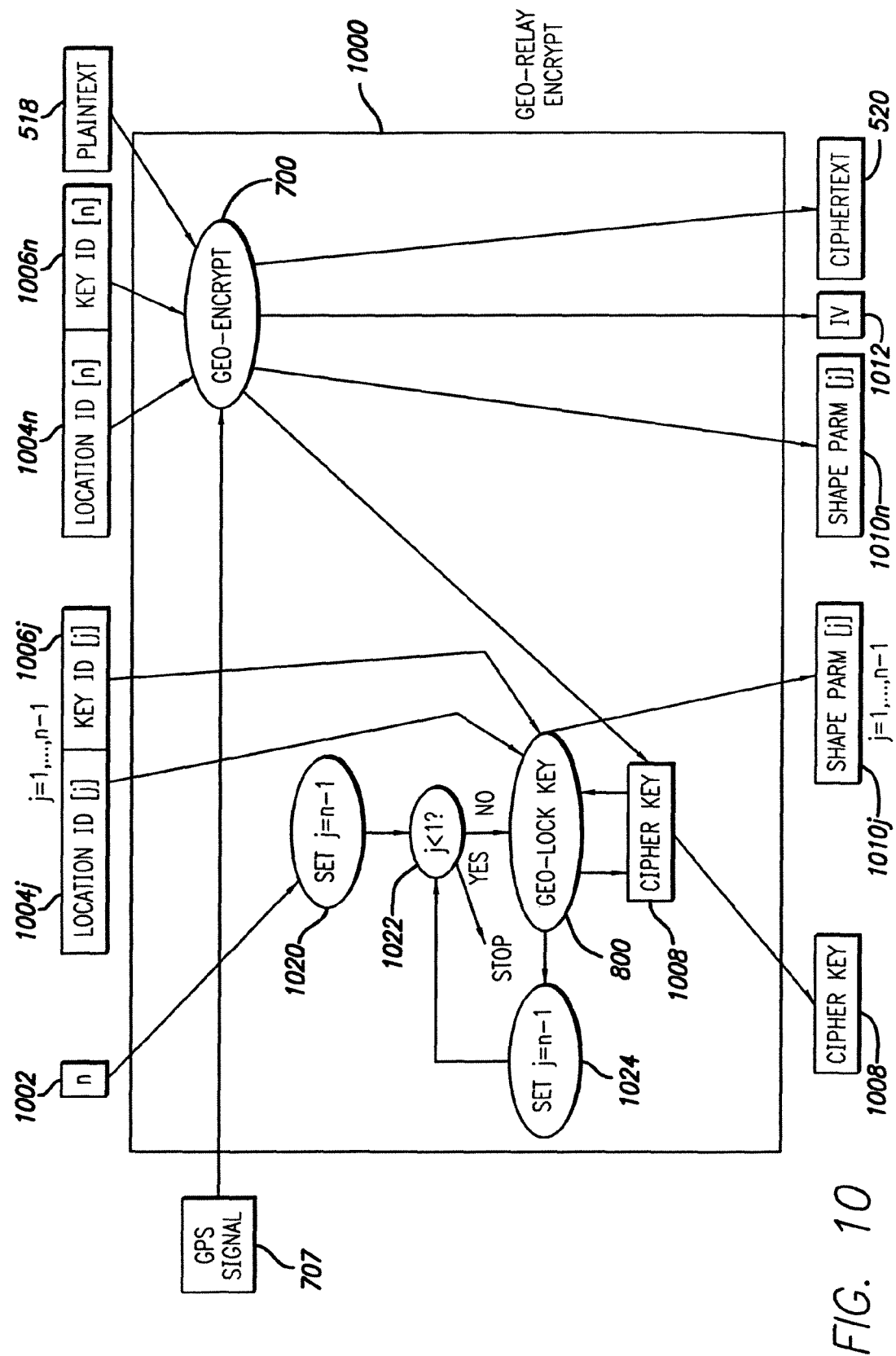
FIG. 10 is a diagram illustrating the operation of an exemplary Geo-Relay Encrypt function.

FIG. 10 illustrates the operation of the Geo-Relay Encrypt function 1000 with reference to Table 1. The Geo-Relay Encrypt function 1000 has inputs n 1002, Location ID [j] 1004j, Key ID [j] 1006j, Location ID [n] 1004n, Key Id [n] 1006n, and Plaintext 518. The input n 1002 corresponds to the total number of sites the data is to pass through on its way to a final receiver (i.e., the nth site) and j is the set of all integers from 1 to n−1. Thus, for every one of the 1 through n−1 receiver sites, there is a corresponding Location ID [j] and Key ID [j], and for the nth receiver site there is a Location ID [n] and Key ID [n]. As a result, the Geo-Relay Encrypt function 1000 will output Shape Parm [j] 1010j (namely, Shape Parm [1], Shape Parm [2], . . . . Shape Parm [n−1]), Shape Parm [n] 1010n, Cipher Key 1008, IV 1012, and Ciphertext 520. The Geo-Relay Encrypt function 1000 accesses the Geo-Encrypt function 700 (described above with respect to FIG. 7) and the Geo-Lock Key function 800 (described above with respect to FIG. 8). The Geo-Lock Key function 800 is embedded in a loop so that it is executed n−1 times, as will be further described below.

The Geo-Relay Encrypt function 1000 accesses the Geo-Encrypt function 700 to encrypt the Plaintext 518 and yield Ciphertext 520 substantially as described above with respect to FIG. 7. The Data encrypting key generated as part of that process is locked using the Geo-Lock Key function 800 with inputs Location ID [n] 1004n and Key ID [n] 1006n to yield Cipher Key 1008, Shape Parm [n] 1010n, and IV 1012. The Cipher Key 1008 is then used as the Data encrypting key input in a loop in which the Geo-Lock Key function 800 is executed n−1 times. The loop begins at step 1020 by initializing a counter by setting j equal to n−1. At step 1022, the counter is tested to determine whether j<1, i.e., a condition indicating that the end of the loop has been reached. If the end condition is met, the Geo-Relay Encrypt function 1000 is terminated. Conversely, if the end condition has not been met, the Geo-Lock Key function 800 is accessed with inputs Location ID [j] 1004j and Key ID [j] 1006j to yield a new Cipher Key 1008 and Shape Parm [j] 1010j. The counter j is then decremented at step 1024, and the loop returns to step 1022 whereupon the end condition for the loop is again tested and the Geo-Lock Key function 800 again accessed if the end condition is not met. With each decrement of the counter, another layer of encryption is added to the Cipher Key 1008. When the end condition for the loop is finally met, and the Geo-Relay Encrypt function 1000 terminated, the final Cipher Key 1008 is passed with the n−1 values of Shape Parm [j] 1010j, Shape Parm [n] 1010n, Ciphertext 520, and IV 708 to the first relay station (e.g., distributor device). The first relay station will use the Geo-Unlock Key function 820 with Shape Parm [1] and Key ID [1] to remove the first layer of encryption from Cipher Key 1008, the next station will use Shape Parm [2] and Key ID [2] to remove the second layer of encryption from Cipher Key 1008, and so forth. Finally, the end relay station will produce the final Cipher Key after performing its unlock. Assuming the final Cipher Key has been properly passed through all relay stations and in the pre-determined order, the Ciphertext 520 can be decrypted.

A preferred embodiment of the invention also includes a set of functions for managing secret key encrypting/decrypting keys in the key tables when the keys are used with private-key cryptography. The functions provide for the creation, replacement, deletion, and distribution of the keys, using geo-encryption and geo-decryption for the distribution. It should be appreciated that the keys themselves can be distributed using either private-key cryptography or public-key cryptography with the geo-encryption and geo-decryption functions. It should also be appreciated that somewhat different functions are needed to manage the public and private keys used with public-key cryptography, in particular any public-key encrypting keys, private-key decrypting keys, private signature keys, and public signature validation keys. A preferred embodiment of this invention uses existing methods to manage these keys, using the key table for storage of the keys. It should be further appreciated that if public-key cryptography is used exclusively for key management, then the functions described herein to manage keys for private-key cryptography would not be required. It should also be appreciated that a combination of public-key and private-key cryptography could be used for key management.

Turning now to the management of secret key encrypting/decrypting keys used with private-key cryptography, every key in the key table of a producer device 300, administrator device 310, distributor device 320, or receiver device 400 is owned by a particular provider. The provider can be a producer, distributor, administrator or any other entity that provides encrypted data. It should be appreciated that administrators are special providers having administrative control over keys. It should be further appreciated that each user of the present invention may further own one or more keys in a given key table to handle their specific needs. In an embodiment of the invention, a key owned by a particular provider is stored in the key table of the provider's device 300, 310, 320 so that the provider can use it to encrypt data or keys. Providers can add new keys to their own devices 300, 310, 320 and to the devices of others, although they may be limited in the total number of keys that can be added to any particular device. Providers also can change and delete any key they own in any device.

When a new provider is added to the network, the administrator device 310 will create one or more keys for the provider that can be used with each device that could receive encrypted data from that provider. Some of these keys may be unique to the devices and will be owned by the provider. The keys will be loaded into the key tables of the producer devices 300, administrator device 310, distributor devices 320, and/or receiver devices 400 that are to receive encrypted data from that provider. The keys will be transmitted remotely to the devices if the devices are already in use in the field. In one embodiment of the invention, the administrator device 310 can change and delete any key in the key table of any other device even if it does not own the key. In another embodiment, the administrator device 310 cannot change or delete keys that it does not own. It should be appreciated that if public-key cryptography is used for key management, it is not necessary for the administrator device 310 to create and distribute keys on behalf of the provider as described above. Instead, a provider can communicate with any other device using the public key of that device.

The functions described below support management of the secret key encrypting/decrypting keys in key tables as shown in Table 1. As previously noted, these keys are used with private-key cryptography, but may be distributed using either public-key or private-key cryptography. In particular, the functions Create Key, Replace Key, and Delete Key are used to manage a provider's own secret keys in its own device. An Export Key function is used to obtain a Key Record from the provider's key table and geo-encrypt it so that the secret key can be securely exported from the provider device 300, 310, 320 and transmitted to another device. Finally, the functions Import New Key, Import Replacement Key, and Import Deletion Key are used in remote devices to handle the import of a previously exported key from another device and update its corresponding key table. In a preferred embodiment of the invention, public-key cryptography is used to authenticate the entity requesting a change in the key table of another device. This ensures that providers can only add, change, and delete keys that they own. The preferred embodiment uses a strong public-key signature algorithm for this purpose, such as RSA or DSA with keys of 2,048 bits or more.

As listed in Table 1, the Create Key function is used to create a new key that is added to a key table. The Create Key function receives as an input a Key ID. The PRNG sub-function may be used to generate a random Key Value. Then, a Key Record is created using the Key Id and the randomly generated Key Value. This newly created Key Record is then added to the key table of the device. Similarly, the Replace Key is used to replace the Key Value corresponding to a Key ID with a new value in a key table. The Replace Key function receives as an input the Key ID, and retrieves the Key Record corresponding to the Key ID from the key table. Then, the Key Value in the Key Record is replaced with a new value generated by the PRNG sub-function. For some applications, it may be desirable to provide a Delete Key function that deletes particular keys from a key table of a device. The Delete Key function receives as an input a particular Key ID in order to delete the corresponding key from the key table.

FIG. 11 illustrates the operation of the Export Key function 1100 with reference to Table 1. The Export Key function 1100 is performed by a provider device 300, 310, 320 in order to export one of its own keys to one or more other devices at specified locations so that the provider can use the key to communicate securely with these other devices. As listed in Table 1, the Export Key function 1100 has three inputs, including: (1) Key ID 505; (2) Location ID 140; and (3) Export Key ID 1102. These inputs are used by the Export Key function 1100 in order to geo-encrypt the Key Record corresponding to Key ID in the device's key table. This encryption is done using Location ID 140 and the key identified by Export Key ID 1102. As a result, a Cipher Key Record 1112 is produced along with a corresponding Cipher Key 526, IV 708, and Shape Parm 509. In a preferred embodiment, the Export Key function 1100 signs the Cipher Key Record 1112 using a private key 308 owned by the provider that is stored in the key table of the provider along with other keys. The private key 308 includes the Provider ID in the key ID field and Priv Key Value in the key value field. As a result, a unique Signature 1116 is generated for the Cipher Key Record 1112.

The Get Key Record sub-function 1110 will first retrieve the Key Record 307 corresponding to the key identified by Key ID 505 from a key table 306 of the device. As described previously, the Key Record 307 includes a specific Key ID and a Key value. The Geo-Encrypt function 700 is accessed to geo-encrypt the retrieved Key Record 307 using the Location ID 140 and Export Key ID 1102. It should be appreciated that in this context the Key Record 307 corresponds to the Plaintext being geo-encrypted in the foregoing description with reference to FIG. 7. This results in a Cipher Key Record 1112 that comprises the geo-encrypted Key Record $307_1$ along with a corresponding Cipher Key 526, IV 708, and Shape Parm 509. The Sign sub-function 1114 is used to digitally sign the Cipher Key Record 1112 using the private key 308 stored in the key table of the device, and thereby provide the Signature 1116. In a preferred embodiment, the Sign sub-function 1114 uses public-key cryptography, as noted above.

The Import New Key function 1150 is also shown in FIG. 11 with reference to Table 1. The Import New Key function 1150 is performed by a provider device 300, 310, 320 or receiver device 400 in order to import a key from another device in order to communicate securely with the other device. As listed in Table 1, the Import New Key function 1150 has seven inputs, including: (1) Shape Parm 509; (2) Export Key ID 1102; (3) Cipher Key 526; (4) IV 708; (5) Cipher Key Record 1112; (6) Provider ID 1152; and (7) Signature 1116. The Cipher Key Record 1112 is decrypted using the key identified by Export Key ID 1102 and Shape Parm 509.

More specifically, the Cipher Key Record 1112 is geo-decrypted using the Geo-Decrypt function 720 with Shape Parm 509, Export Key ID 1102, Cipher Key 526, IV 708, GPS location signal 727, and Cipher Key Record 1112 as inputs to recover the Key Record 307. A Provider ID Verification sub-function 1160 will then determine whether the Provider ID 1152 corresponds to either the Owner ID of the deciphered Key Record 307 or a Geo-encryption Key Authority (GKA) (i.e., an accepted key authority). If the Provider ID 1152 corresponds to one of these, i.e., the Owner ID or the GKA, then the Signature 1116 for the Key Record 307 is validated using a Check Signatures sub-function 1170. The Check Signatures sub-function 1170 validates the Signature 1116 for Key Record 307 using the public key associated with the Provider ID, which would be obtained from the key table using Provider ID 1152 and possibly other information to identify the key. If the Signature 1116 proves to be valid, the Key Record 307 is added to the key table 406 by sub-function 1166. Conversely, if the Provider ID Verification sub-function 1160 determines that the Provider ID 1152 corresponds to neither the Owner ID of the deciphered Key Record 307 or the GKA, the key table 406 is not updated. It should be noted that the public key associated with Provider ID 1152 might itself be validated using a certificate stored with the key in the key table or obtained using any of several methods without altering the scope and spirit of the invention.

The Import New Key function allows administrator devices 310 to add any key in a key table, including those it does not own. In a preferred embodiment that does not use public-key cryptography for key distribution, this capability of administrator devices 310 is necessary for distributing keys used by new provider devices 300, 320 to communicate with receiver devices 400. If the conditions described above are met, then the Import New Key function updates the key table to include the new Key Record 307. Similarly, the Import Replacement Key function allows administrator devices 310 to change any key in a key table, including those it does not own. Namely, the Import Replacement Key function updates the key table by replacing the old Key Record corresponding to a particular Key ID with a new one (i.e., the one just imported). The purpose of giving administrator devices 310 this capability is so that they can handle a situation where a provider loses its keys or has its keys sabotaged in some way. It may alternatively be desirable in some circumstances to deny administrator devices 310 this capability. The Import Deletion Key function allows administrator devices 310 to delete any key in a key table, including those it does not own. The Import Deletion Key function updates the key table by deleting the Key Record corresponding to a particular Key ID. The purpose of giving administrator devices 310 this capability is so that they can clear out the keys owned by a defunct provider. It may alternatively be desirable in some circumstances to deny administrator devices 310 this capability.

In an alternative embodiment of the invention, digital information is associated with the location identity attribute 140 by encrypting the digital information using a location-based key. Particularly, a random data encrypting key is generated as described above, and a location value is derived from a location identity. The random data encrypting key and the location value are combined together using an exclusive-OR operation to provide a location-based key. The location-based key is used to encrypt the digital information. The random data encrypting key is encrypted using a key encrypting key, and the encrypted random data encrypting key and the encrypted digital information is communicated to the receiver. The receiver decrypts the random data encrypting key, determines the location value, and takes the exclusive-OR of the two numbers together to recover the location key. The digital data can then be decrypted using the recovered location key. A drawback of this alternative approach is that it is not well suited to re-locking or relay encryption because the digital data is encrypted using location information. Hence, the data itself would have to be re-encrypted, and not just the key. In applications in which the data is relatively short, then re-encrypting the data may be acceptable.

The functions described above can be used to restrict access to data that is transmitted over networks and telecommunications systems as well as data that is stored on a digital medium. As noted earlier, the data can be of any type and any form. Access to the data may be controlled for several reasons. For example, the data could be copyright-protected, classified, or sensitive. The following describes exemplary methods for using these functions to restrict access to transmitted and stored data when private-key cryptography is used for key distribution. In this description, it should be appreciated that references are made with respect to various functions listed in Table 1 along with their corresponding flow charts provided in FIGS. 7-11. These methods may be used to support a variety of applications. For example, they can be used to support the secure distribution of movies, television programs, lectures, documents, and other types of data. These methods allow a producer or distributor of data to limit access to the data. Within this context, receivers may include customers or subscribers. It should be appreciated that different methods may be used if public-key cryptography is used for key management exclusively or in combination with private-key cryptography.

In order for a provider to send encrypted data to a receiver, both the provider device 300, 310, 320 and the receiver device 400 must share a common secret key encrypting/decrypting key in their respective key tables. This key is owned by the provider, thereby allowing the provider to change it or delete it as desired. It should be noted that the key is not actually used to encrypt the data. Rather, it is used with location information to encrypt a random data encryption key. Initially, both the provider devices 300, 310, 320 and the receiver device 400 are initialized with a secret key that is specific to the administrator device 310. These keys are loaded into the respective key tables of provider devices 300, 310, 320 and receiver device 400 at the time the devices are produced.

As previously described, the first step is for the administrator device 310 to create a key that is owned by the provider and can be used by the provider to communicate with the receiver. Letting Provider ID denote the identity of the provider, administrator device 310 first performs the operation Create Key with input Key ID, where Key ID=(Provider ID, Key Name) for some Key Name. This operation may be performed at the request of the provider. The effect of the Create Key operation is that a new secret key is created with this Key ID. A record with the key is added to the key table 316 of the administrator device 310. Next, the administrator device 310 performs the operation Export Key with inputs Key ID, Provider Location ID, and Provider Export Key ID, where Key ID is the same as before, Provider Location ID is the location of the provider device 300, 320 and Provider Export Key ID is the identifier of the key shared by administrator device 310 and the provider device 300, 320. This will yield values Provider Shape Parm, Provider Cipher Key, IV, Provider Cipher Key Record, and Signature, which administrator device 310 transmits to the provider device 300, 320. Upon receipt, the provider devices 300, 320 then perform the function Import New Key with inputs Provider Shape Parm, Provider Export Key ID, Provider Cipher Key, IV, Provider Cipher Key Record, and Signature. The purpose of this function is to decrypt Provider Cipher Key Record in order to produce a plaintext Key Record, to validate that the Key Record was signed by administrator device 310, and then to insert the record into the key table of the device.

In addition, the administrator device 310 exports the key in a form that can be decrypted by the receiver device 400. In particular, the administrator device 310 performs the function Export Key with inputs Key ID, Receiver Location ID, and Receiver Export Key ID, where Key ID is the same as before, Receiver Location ID is the location of the receiver device 400, and Receiver Export Key ID is the identifier of a key shared by administrator device 310 and the receiver device 400. This will yield the values Receiver Shape Parm, Receiver Cipher Key, IV, Receiver Cipher Key Record, and Signature, which the administrator device 310 transmits to the receiver device 400. Upon receipt, the receiver device 400 then performs the function Import New Key with inputs Receiver Shape Parm, Receiver Export Key ID, Receiver Cipher Key, IV, Receiver Cipher Key Record, and Signature. The purpose of this function is to decrypt Cipher Key Record in order to produce a plaintext Key Record, to validate that the administrator device 310 signed the Key Record, and then to insert the record into the device's key table.

If the provider devices 300, 320 request that the secret key be shared with multiple receiver devices 400, perhaps even all receiver devices 400, then the administrator device 310 exports the secret key to each such receiver device 400 separately using the unique key and location of each receiver device 400. Alternatively, the administrator device 310 can export the secret key to all receiver devices 400 simultaneously if the devices have a common key that is shared with the administrator device 310. The location used for this would be large enough to include all the receiver devices 400 that are authorized to receive data from this particular provider device 300, 320. It could be, for example, a universal location that encompasses the entire world. Alternatively, if a provider device 300, 310 is only authorized to send data to receiver devices 400 in certain locations, then the administrator device 310 could set up the keys in such manner that the provider device 300, 310 does not have a shared key with receiver devices 400 outside of these locations. As new receiver devices 400 join the system, the key can be exported to them accordingly. This approach for establishing a secure key can be used for any pair of entities, for example, a producer device 300 and a receiver device 400, or a producer device 300 and a distributor device 320, or a distributor device 320 and a receiver device 400, or two distributor devices 320.

Once a provider device 300, 320 has a shared key with a receiver device 400 or with multiple receiver devices 400, it can create and export keys of its own to these receiver devices 400 using the same technique used by the administrator device 310 to create and export keys. For example, a cable-TV company might create a monthly key for paid subscribers using the Create Key function. This key would be exported from its device using the Export Key function and sent to paid subscribers. Then, each month the key would be replaced with a new one using the Replace Key function. The new key would be exported with the Export Key function and sent to paid subscribers, who would receive and install it with the Import Replacement Key function. Subscribers who failed to pay would not get the new key, and, therefore, would be unable to decrypt future programs.

As another example, a provider device 300, 320 might issue daily keys, identified with key names such as Monday, Tuesday, and so forth. It would issue the key for a particular day at the beginning of the day. The daily keys could be exported under longer-term keys such as monthly keys or individual receiver device 400 keys. Each weekly key would be good for seven days, and would be replaced when that period ends.

As a third example, a provider device 300, 320 might issue keys that are associated with classification levels. For example, the Key Names might be "secret", "confidential", and "unclassified". Secret keys would be issued to receiver devices 400 that are cleared at the "secret" level, "confidential" keys to receiver devices 400 that are cleared at the "confidential" or "secret" level, and "unclassified" keys to all receiver devices 400 allowed to receive data from the provider device 300, 320. Data that is classified "secret" would be enciphered using a Location Key derived from location and the secret key. "Confidential" and "unclassified" data would be handled in a similar manner.

The administrator device 310 can at any time replace one of its own keys using the Replace Key function with input Key ID. This function will put a new secret Key Value in its key table record for that Key ID. The administrator device 310 then exports the key to provider devices 300, 320 and receiver devices 400 using it in the same manner as the original key that was exported. At the receiving end, either the provider device 300, 320 or receiver device 400 will then use the Import Replacement Key function to import this key.

Once a secret key is established between a producer device 300 and a receiver device 400, the producer device 300 can transmit data to the customer at a specific location in such a manner that the data is not accessible either at other locations or by receiver devices 400 lacking the key. First, the producer device 300 performs the Geo-Encrypt function with inputs Location ID, Key ID, and Plaintext, where Plaintext is the digital data, Location ID identifies the location of the customer(s), and Key ID identifies the shared key as before. This produces the values Shape Parm, Cipher Key, IV, and Ciphertext, where Ciphertext is the Plaintext encrypted under a random data encrypting key and Cipher Key is the encryption of the data encrypting key using the location specified by Location ID and the key specified by Key ID. These values are transmitted to one or more receiver devices 400 along with the Key ID. The intended receiver devices 400 would all share a location identified by Location ID.

The receiver devices 400 at the specified location can decrypt the data by performing the Geo-Decrypt function with inputs Shape Parm, Key ID, Cipher Key, IV, and Ciphertext. If the location of the receiver device 400 is not correct, or if the receiver device 400 does not have the key identified by Key ID, the decryption will fail. If the receiver device 400 is implemented with a Geo-Decrypt function that destroys the Cipher Key when decryption fails, the Ciphertext will henceforth become undecipherable.

A producer device 300 can transmit the same data to multiple receiver devices 400 at different locations with different secret keys without the need to re-encrypt the data. Instead, it suffices to re-lock the key under the different locations and keys. The following shows the method for doing this when there are three receiver devices 400. First, the producer device 300 geo-encrypts the Plaintext for the first receiver device 400 using the Geo-Encrypt function with inputs Location ID [1], Key ID [1], and Plaintext. This function produces the results Shape Parm [1], Cipher Key [1], IV, and Ciphertext. These values along with Key ID [1] are transmitted to the first receiver device 400. Next, Cipher Key [1] is re-locked with the location and secret key of the second receiver device 400 using the Geo-Relock function with inputs Shape Parm [1], Key Id [1], Cipher Key [1], Location ID [2], and Key ID [2]. This function produces the results Shape Parm [2] and Cipher Key [2]. These values along with Key ID [2], IV, and Ciphertext are transmitted to the second receiver device 400.

Cipher Key [1] is then also re-locked with the location and secret key of the third receiver device 400 using the Geo-Relock Key function with inputs Shape Parm [1], Key ID [1], Cipher Key [1], Location ID [3], and Key ID [3]. This function produces the results Shape Parm [3] and Cipher Key [3]. These values along with Key ID [3], IV and Ciphertext are transmitted to the third receiver device 400. Each of the three receiver devices 400 then uses the Geo-Decrypt function 720 to decrypt the common Ciphertext. It should be appreciated that this method can be extended to any number of receiver devices 400. Furthermore, if there are multiple receiver devices 400 at a common location and with a common secret key, they can be sent the same values.

A method for securing data distribution from a producer device 300 to a receiver device 400 via a distributor device 320 is similar to the preceding method except that the producer device 300 does not distribute its data directly to the receiver devices 400. Instead, the data is forwarded to a distributor device 320, which in turn forwards it on to appropriate receiver devices 400. The distributor device 320 re-encrypts the data (actually, the key) for transmission to these receiver devices 400. Initially, the producer device 300 and distributor device 320 share a secret key that is owned by the producer. In addition, the distributor device 320 and receiver devices 400 share a key that is owned by the distributor. Within this embodiment, it should be appreciated that the producer device 300 does not need to share a key with the receiver devices 400 or even know the identity of the receivers.

The producer device 300 begins this process by geo-encrypting the data for transmission to the distributor device 320. This is done by performing the Geo-Encrypt function with inputs Distributor Location ID, Distributor Key ID, and Plaintext, where Distributor Key ID is the identifier of the key that is owned by the producer and shared with the distributor device 320 and Distributor Location ID is the location of the distributor device 320. The result of this operation yields the values Distributor Shape Parm, Distributor Cipher Key, IV, and Ciphertext. The producer device 300 then transmits these values to the distributor device 320 along with Distributor Key ID. The distributor device 320 then performs the Geo-Relock Key function with inputs Distributor Shape Parm, Distributor Key ID, Distributor Cipher Key, Receiver Location ID, and Receiver Key ID, where Receiver Key ID is the identifier of the key that is owned by the distributor and shared with the receiver device 400 and Receiver Location ID is the location of the receiver device 400. The result of this operation is a value for Receiver Shape Parm and Receiver Cipher Key. These values are transmitted to the receiver device 400 along with Receiver Key ID, IV, and Ciphertext. In order to yield Plaintext, the receiver device 400 then performs the Geo-Decrypt function with inputs Receiver Shape Parm, Receiver Key ID, Receiver Cipher Key, IV, and Ciphertext. The advantage of this approach is that the producer does not need to know anything about the receivers. Moreover, the distributor 320 manages the receiver devices 400. Such an embodiment could be attractive for a small producer 300. For example, a distributor could keep track of sales of the producer's data to receivers, and then pass along the sales income, minus a service fee, to the producer. Of course, other arrangements are also possible. For example, the producer could license use of its data by the distributor without regard to individual sales.

With the preceding method, a distributor may readily decrypt and access plaintext. The distributor could then re-encrypt the data for any receiver device 400 to which it has access regardless of the producer's intentions. With the implementation of a relay encryption function this is not possible because the producer device 300 locks the data encryption key first with a location and key that is shared with the receiver device 400 and then with a location and key that is shared with the distributor device 320. The distributor device 320 can strip off its own encryption layer, but not the receiver device's 400 encryption layer, so the data can never go to a receiver device 400 other than the one authorized by the producer device 320. With relay encryption, the producer can also be sure that the data will pass through the distributor device 320 before it is decrypted, as the receiver device 400 cannot remove the encryption layer of the distributor device 320.

In order to achieve this task, the producer device 300 first performs the Geo-Relay Encrypt function with inputs n, Distributor Location ID, Distributor Key ID, Receiver Location ID, Receiver Key ID, and Plaintext, where it is understood that n=2. This operation yields the values Distributor Shape Parm, Receiver Shape Parm, Cipher Key, IV, and Ciphertext. These values are transmitted to the distributor device 320 along with Distributor Key ID and Receiver Key ID. The distributor device 320 then uses the key identified by Distributor Key ID to strip off its layer of key encryption on Cipher Key. This is done by performing the Geo-Unlock Key function with inputs Distributor Shape Parm, Distributor Key ID, and Cipher Key. This operation yields New Cipher Key, which is transmitted to the receiver device 400 along with Receiver Key ID, Receiver Shape Parm, IV, and Ciphertext. Finally, the receiver device 400 deciphers the Ciphertext by performing the Geo-Decrypt function with inputs Receiver Shape Parm, Receiver Key ID, New Cipher Key, IV, and Ciphertext. It should be noted that the above method could also be used to relay data through multiple distributor devices 320 instead of just one.

With relay encryption, a producer maintains control over access to its data, while still benefiting from the use of a distributor. Such an embodiment could be attractive to large producers. A producer may, for example, use relay encryption to control the distribution of its data from multiple distributors. Within such embodiment, one distributor device 320 could be given encrypted data destined for receiver devices 400 in one geographic region. A second distributor device 320 could then be given the same encrypted data, but with the data encryption key re-locked so as to be decipherable only by receiver devices 400 in a second region, and so on. Distributors owning the distribution rights of different geographic regions would thus be unable to infringe upon each other's regions.

In another embodiment, the Geo-Encrypt 700 and Geo-Decrypt 720 functions may be used by any provider device 300, 310, 320 to respectively encrypt and decrypt data that is stored by the provider. Within such embodiment, encryption and decryption are specific to the location of the provider device 300, 310 and a secret key stored in the provider's key table. In order to achieve this task, the provider device 300, 310, 320 first encrypts the data by performing the Geo-Encrypt function with inputs Location ID, Key ID, and Plaintext, where Location ID identifies the location of the provider device 300, 310, 320 and Key ID identifies the key of the provider device 300, 310, 320. This produces the values Shape Parm, Cipher Key, IV, and Ciphertext, which would then be stored in the ciphertext file along with Key ID. At a later time, the provider device 300, 310, 320 decrypts the data by performing the Geo-Decrypt function with inputs Shape Parm, Key ID, Cipher Key, IV, and Ciphertext, using the values obtained from the ciphertext file.

If the data is to be stored for an extended period, the Cipher Key might be relocked with a new key from time to time. Also, if the Key Value associated with this particular Key ID ever changes as the result of an Update Key operation, Cipher Key would have to be unlocked with the old value and re-locked with a new value before the old value is discarded. Otherwise, the data would become undecipherable.

In summary, by enabling location-based encryption and path-dependent encryption, the present invention has numerous advantages over the prior art. One such advantage is that it adds an additional layer of security to any encryption system. Not only does the recipient need access to a secret key, but the recipient also must be at a particular location in order to decrypt data. Another advantage pertains to the distribution of confidential materials where one of the parties in the communication cannot be trusted to maintain the confidentiality of the materials. The present invention uses a combination of location and key table keys, both of which can be implemented transparently to the user, to defeat the threat of disclosure by a user who cannot be trusted with the cryptographic keys. As previously described, the present invention may also be implemented to render digital information unusable if access is attempted that is invalid, by destroying or re-encrypting the digital information.

The present invention enables producers to actively control and participate in the encryption of their proprietary data, even after release from their protected domain, through their ability to own and control keys in receiver devices 400 and to multi-lock keys so that data can only be unlocked by a final receiver 400 and not by intermediate distributor devices 320. Specifically, digital information can be encrypted in such a way that it can only be decrypted at the receiver device 400 if its transmission has followed a pre-defined path over the network 200, passing through specific geographic locations. A unique method is provided by the present invention in which digital information can be encrypted in such a way that, as it moves from provider device 300, 310, 320 to final receiver device 400, each distributor on the path to the target location must remove its lock from the cipher key. Final decryption is possible only after all locks have been removed.

Key management is often the weakness of a cryptographic system. The present invention addresses this weakness by allowing for the dynamic management of all keys over a network in a secure manner that is transparent to the user and by allowing for the use of public-key cryptography. Also, unlike DRM systems that require separate steps to access both the Ciphertext and the key or license required for decryption, the present invention uses a single digital data acquisition step.

Having thus described a preferred embodiment of a system and method for delivering encrypted information in a communication network using location identity and key tables, it should be apparent to those skilled in the art that certain advantages have been achieved. It should also be appreciated that various modifications, adaptations, and alternative embodiments thereof may be made within the scope and spirit of the present invention. The invention is further defined by the following claims.

What is claimed is:

1. A system for controlling access to content data, comprising:
   a receiver device, and
   a distributor device comprising a memory, a cryptographic engine adapted to perform encryption and decryption functions, and a processor operatively coupled to the memory and the cryptographic engine, the processor of the distributor device being adapted to communicate with the receiver device via a communications network, wherein the processor of the distributor device is further adapted to:
   (a) enable the cryptographic engine of the distributor device to use a data encrypting/decrypting key to encrypt the content data;
   (b) enable the cryptographic engine of the distributor device to use a key encrypting/decrypting key to encrypt both the data encrypting/decrypting key and at least one content-owner constraint; and (c) send the encrypted content data, the encrypted data encrypting/decrypting key and the at least one encrypted content-owner constraint to the receiver device via the communications network;

wherein the receiver device comprises a memory, a cryptographic engine adapted to perform encryption and decryption functions, and a processor operatively coupled to the memory and the cryptographic engine, the processor of the receiver device being adapted to communicate with the communications network, wherein the processor of the receiver device is further adapted to:

(a) receive via the communications network the encrypted content data, the encrypted data encrypting/decrypting key and the at least one encrypted content-owner constraint;

(b) enable the cryptographic engine of the receiver device to decrypt both the encrypted data encrypting/decrypting key and the at least one encrypted content-owner constraints;

(c) decrypt the encrypted content data if the at least one content-owner constraint is satisfied, and (d) enable the cryptographic engine of the receiver device to use a second key encrypting/decrypting key to re-encrypt the data encrypting/decrypting key and to send the encrypted content data and the re-encrypted data encrypting/decrypting key to at least one other receiver device via the communications network, wherein the second key encrypting/decrypting key is different from the first key encrypting/decrypting key.

2. The system of claim 1, wherein the processor of the receiver device is further adapted to enable the cryptographic engine of the receiver device to use the key encrypting/decrypting key to decrypt both the encrypted data encrypting/decrypting key and the at least one encrypted content-owner constraints.

3. The system of claim 1, wherein the processor of the distributor device is further adapted to generate the data encrypting/decrypting key.

4. The system of claim 1, wherein the processor of the distributor device is further adapted to generate the key encrypting/decrypting key.

5. The system of claim 1, wherein the processor of the receiver device is further adapted to generate the second key encrypting/decrypting key.

6. The system of claim 1, wherein the processor of the receiver device is further adapted to generate a key identifier (ID) associated with the second key encrypting/decrypting key and to send the key ID and the second key encrypting/decryption key to the at least one other receiver.

7. The system of claim 6, wherein the processor of the receiver device is further adapted to enable the cryptographic engine of the receiver device to encrypt the second key encrypting/decrypting key and the key ID before it is sent to the at least one other receiver.

8. The system of claim 1, wherein the at least one content-owner constraint comprises a permissible time period for use of the content data, and the receiver device further comprises a time source, the processor of the receiver device being further adapted to retrieve a current time measurement from the time source and determine whether the current time measurement satisfies the permissible time period.

9. The system of claim 1, wherein the at least one content-owner constraint comprises a permissible geographical proximity for use of the content data, wherein the receiver device further comprises a geographic data source, the processor of the receiver device being further adapted to retrieve a current geographic location measurement from the geographic data source, and determine whether the current geographic location satisfies the permissible geographic proximity.

10. The system of claim 1, wherein the at least one content-owner constraint comprises at least a permissible time period for use of the content data and a permissible geographical proximity for use of the content data.

11. The system of claim 1, wherein the receiver device comprises a tamperproof, secure enclosure for preventing unauthorized access to at least the data encrypting/decrypting key.

12. The system of claim 11, wherein the at least one other receiver device comprises a tamperproof, secure enclosure for preventing unauthorized access to at least the data encrypting/decrypting key.

13. The system of claim 1, wherein the processor of the receiver device is further adapted to enable the cryptographic engine of the receiver device to use the data encrypting/decrypting key to decrypt the content data if the at least one content-owner constraint is satisfied.

14. The system of claim 6, wherein the processor of the receiver device is further adapted to enable the cryptographic engine of the receiver device to use the second key encrypting/decrypting key to encrypt at least one other content-owner constraint and send the at least one other encrypted content-owner constraint to the at least one other receiver.

15. The system of claim 14, wherein the at least one other content-owner constraint is the same as the at least one content-owner constraint.

16. The system of claim 14, wherein the at least one other content-owner constraint is at least partially the same as the at least one content-owner constraint.

17. The system of claim 14, further comprising the at least one other receiver, wherein the at least one other receiver device comprises a memory, a cryptographic engine adapted to perform at least a decryption function, and a processor operatively coupled to the memory and the cryptographic engine, the processor of the at least one other receiver device being adapted to receive via the communications network the second key encrypting/decrypting key and the key ID, and to store the second key encrypting/decrypting key and the key ID in the memory of the at least one other receiver so that the key ID is linked to the second key encrypting/decrypting key.

18. The system of claim 17, wherein the processor of the at least one other receiver device is further adapted to (i) receive via the communications network the encrypted content data, the re-encrypted data encrypting/decrypting key, and the at least one other encrypted content-owner constraint, (ii) receive via the communications network a retransmission of the key ID, (iii) use the key ID to retrieve the second key encrypting/decrypting key from the memory of the at least one other receiver device, and (iii) enable the cryptographic engine of the at least one other receiver device to use the second key encrypting/decrypting key to decrypt the at least one other encrypted content-owner constraint.

19. The system of claim 18, wherein the processor of the at least one other receiver device is further adapted to render the content data if the at least one other content-owner constraint is satisfied.

20. The system of claim 19, wherein the processor of the at least one other receiver device is further adapted to enable the cryptographic engine of the at least one other receiver device to use the data encrypting/decrypting key to decrypt the content data if the at least one other content-owner constraint is satisfied.

21. The system of claim 20, wherein the processor of the at least one other receiver device is further adapted to enable the cryptographic engine of the at least one other receiver device to use the second key encrypting/decrypting key to decrypt the content data if the at least one other content-owner constraint is satisfied.

22. A method for controlling access to content data, comprising:
   a distributor device (i) using a data encrypting/decrypting key to encrypt the content data, (ii) using a key encrypting/decrypting key to encrypt both the data encrypting/decrypting key and at least one content-owner constraint, and (iii) sending the encrypted content data, the encrypted data encrypting/decrypting key and the at least one encrypted content-owner constraint to a receiver device via a communication network; and
   a receiver device (i) receiving via the communications network the encrypted content data, the encrypted data encrypting/decrypting key and the at least one encrypted content-owner constraint, (ii) decrypting both the encrypted data encrypting/decrypting key and the at least one encrypted content-owner constraint, (iii) decrypt the encrypted content data if the at least one content-owner constraint is satisfied, (iv) using a second key encrypting/decrypting key to re-encrypt the data encrypting/decrypting key, and (v) sending the encrypted content data and the re-encrypted data encrypting/decrypting key to at least one other receiver device via the communications network.

23. The method of claim 22, wherein the step of the receiver device decrypting both the encrypted data encrypting/decrypting key and the at least one encrypted content-owner constraint further comprises the receiver device using the key encrypting/decrypting key to decrypt both the encrypted data encrypting/decrypting key and the at least one encrypted content-owner constraint.

24. The method of claim 22, further comprising the distributor device generating the data encrypting/decrypting key.

25. The method of claim 22, further comprising the distributor device generating the key encrypting/decrypting key.

26. The method of claim 22, further comprising the receiver device generating the second key encrypting/decrypting key.

27. The method of claim 23, further comprising the receiver device generating a key identifier (ID) associated with the second key encrypting/decrypting key and sending the key ID and the second key encrypting/decrypting key to the at least one other receiver.

28. The method of claim 27, further comprising the receiver encrypting the key ID and the second key encrypting/decrypting key before sending it to the at least one other receiver.

29. The method of claim 22, wherein the step of determining whether the at least one content-owner constraint is satisfied further comprises the steps of retrieving a current time from a time source and determining whether the current time satisfies a permissible time period.

30. The method of claim 22, wherein the step of determining whether the at least one content-owner constraint is satisfied further comprises the steps of retrieving a current geographic location from a geographic data source and determining whether the current geographic location satisfies a permissible geographic proximity.

31. The method of claim 22, wherein the step of determining whether the at least one content-owner constraint is satisfied further comprises the steps of retrieving a current time, retrieving a current geographical location, determining whether the current time satisfies a permissible time period, and determining whether the current geographic location satisfies a permissible geographic proximity.

32. The method of claim 22, further comprising the receiver device using the data encrypting/decrypting key to decrypt the content data if the at least one content-owner constraint is satisfied.

33. The method of claim 32, further comprising the receiver device using the second key encrypting/decrypting key to encrypt at least one other content-owner constraint and sending the at least one other encrypted content-owner constraint to the at least one other receiver.

34. The method of claim 33, wherein the at least one other content-owner constraint is the same as the at least one content-owner constraint.

35. The method of claim 33, wherein the at least one other content-owner constraint is at least partially the same as the at least one content-owner constraint.

36. The method of claim 33, further comprising the at least one other receiver device receiving via the communications network the second key encrypting/decrypting key and the key ID, and storing the second encrypting/decrypting key and the key ID in a memory of the at least one other receiver device so that the key ID is linked to the second encrypting/decrypting key.

37. The method of claim 36, further comprising the at least one other receiver device (i) receiving via the communications network the encrypted content data, the re-encrypted data encrypting/decrypting key, and the at least one other encrypted content-owner constraint, (ii) receiving via the communications network a retransmission of the key ID, (iii) using the key ID to retrieve the second key encrypting/decrypting key from the memory of the at least one other receiver device, and (iv) using the second key encrypting/decrypting key to decrypt the at least one other encrypted content-owner constraint.

38. The method of claim 37, further comprising the at least one other receiver device using the second key encrypting/decrypting key to decrypt the data encrypting/decrypting key if the at least one other content-owner constraint is satisfied.

39. The method of claim 38, further comprising the at least one other receiver device, after the encrypted data encrypting/decrypting key is decrypted, using the data encrypting/decrypting key to decrypt the encrypted content data.

40. The method of claim 37, wherein the step of the at least one other receiver device using the second key encrypting/decrypting key to decrypt the at least one other encrypted content-owner constraint, further comprises using the second key encrypting/decrypting key to decrypt both the at least one other encrypted content-owner constraint and the data encrypting/decrypting key.

41. The method of claim 40, further comprising the at least one other receiver device using the data encrypting/decrypting key to decrypt the encrypted content data if the at least one other content-owner constraint is satisfied.

42. The method of claim 22, further comprising enclosing the receiver device in a tamperproof, secure enclosure to prevent unauthorized access to at least the data encrypting/decrypting key.

43. The method of claim 22, further comprising enclosing the at least one other receiver device in a tamperproof, secure enclosure to prevent unauthorized access to at least the data encrypting/decrypting key.

* * * * *